United States Patent
Paled et al.

(10) Patent No.: US 12,327,424 B2
(45) Date of Patent: Jun. 10, 2025

(54) SYSTEMS AND METHODS FOR INTELLIGENT ZONAL RECOGNITION AND AUTOMATED CONTEXT MAPPING

(71) Applicant: OPEN TEXT HOLDINGS, INC., San Mateo, CA (US)

(72) Inventors: Satish Chandra Paled, Hyderabad (IN); Darshil Ajay Parekh, Hyderabad (IN); Shabhari Nath Gampa, Hyderabad (IN); Sai Krishna Bhargav Veldi, Khammam District (IN)

(73) Assignee: OPEN TEXT HOLDINGS, INC., Menlo Park, CA (US)

( * ) Notice: Subject to any disclaimer, the term of this patent is extended or adjusted under 35 U.S.C. 154(b) by 477 days.

(21) Appl. No.: 17/716,152

(22) Filed: Apr. 8, 2022

(65) Prior Publication Data

US 2023/0274569 A1 Aug. 31, 2023

Related U.S. Application Data

(60) Provisional application No. 63/313,776, filed on Feb. 25, 2022.

(51) Int. Cl.
*G06V 30/414* (2022.01)
*G06V 30/412* (2022.01)
*G06V 30/418* (2022.01)

(52) U.S. Cl.
CPC .......... *G06V 30/414* (2022.01); *G06V 30/412* (2022.01); *G06V 30/418* (2022.01)

(58) Field of Classification Search
CPC .. G06V 30/414; G06V 30/412; G06V 30/418; G06V 30/10; G06V 30/413; G06V 10/82; G06V 30/416; G06V 30/19173; G06V 30/40; G06V 10/462; G06V 30/153; G06V 30/162; G06V 30/18086; G06V 30/18143; G06V 30/18152; G06V 30/19107; G06V 30/19147; G06V 30/224; G06F 16/355; G06F 16/93; G06F 40/30; G06F 16/5846; G06F 16/906
See application file for complete search history.

(56) References Cited

U.S. PATENT DOCUMENTS

| | | | |
|---|---|---|---|
| 8,843,494 B1 | 9/2014 | Sampson | |
| 11,250,255 B2 * | 2/2022 | Ast | G06N 3/045 |
| 11,847,175 B2 * | 12/2023 | Ferreira | G06V 30/412 |
| 11,893,818 B2 * | 2/2024 | Zagaynov | G06F 18/2163 |
| 11,899,727 B2 * | 2/2024 | Ghatage | G06N 20/00 |

(Continued)

OTHER PUBLICATIONS

Office Action issued by the U.S. Patent and Trademark Office (USPTO) for U.S. Appl. No. 17/716,148, mailed Jan. 16, 2025, 7 pages.

(Continued)

*Primary Examiner* — Michael S Osinski
(74) *Attorney, Agent, or Firm* — SPRINKLE IP LAW GROUP

(57) ABSTRACT

Embodiments of document processing systems and methods for intelligent zonal recognition and context mapping are disclosed. These document processing systems and methods may utilize image processing and heuristic techniques to determine key zones from a minimal set of example documents of a document type and map those key zones to a context definition.

21 Claims, 21 Drawing Sheets

(56) References Cited

U.S. PATENT DOCUMENTS

| | | | |
|---|---|---|---|
| 2013/0259388 A1* | 10/2013 | Yoshida | H04N 19/61 |
| | | | 382/218 |
| 2015/0085327 A1* | 3/2015 | Kostyukov | H04N 1/4092 |
| | | | 358/451 |
| 2018/0285321 A1* | 10/2018 | Antony | G06V 30/153 |
| 2019/0050639 A1* | 2/2019 | Ast | G06F 40/30 |
| 2020/0117944 A1* | 4/2020 | Duta | G06F 16/355 |
| 2021/0240977 A1* | 8/2021 | Teraguchi | G06V 30/418 |
| 2021/0334454 A1* | 10/2021 | Nguyen | G06V 30/153 |
| 2022/0159144 A1* | 5/2022 | Yamanaka | G06F 16/93 |
| 2023/0114965 A1* | 4/2023 | Ferreira | G06F 16/355 |
| | | | 707/737 |
| 2023/0237100 A1* | 7/2023 | Ferreira | G06V 10/82 |
| | | | 707/755 |
| 2023/0274568 A1 | 8/2023 | Paled et al. | |

OTHER PUBLICATIONS

Notice of Allowance issued by the U.S. Patent and Trademark Office for U.S. Appl. No. 17/716,148, mailed Apr. 16, 2025, 10 pages.

\* cited by examiner

The White Rabbit

Name: Michelle
Street Address: 817 Morgan Street
City, State: Vernon, FL
Zip Code: 32462
Phone: 850-535-5428
E-mail: 7z8e296j2c@temporary-mail.net

MEDICAL EXPERT WITNESS INVOICE

Invoice # [No] 784687744        Date: August 19, 2021

Client / Customer
Name: Miranda T Barber
Street Address: 817 Morgan Street
City, State: Vernon, FL
Zip Code: 32462

| Description | Hours | $ / Hours | Amount ($) |
|---|---|---|---|
| Endoscopy | 2 | 100 | 200 |
| Bed Charges | 120 | 10 | 1200 |
| | | | |
| | | | |
| | | | |
| | | | |
| | | | |
| | | | |
| | | | |
| | | | |
| | | | |
| | | | |

[Comments or Special Instructions]

Payment is due within [Number (#)] days.

| | |
|---|---|
| SUBTOTAL | 1400 |
| DISCOUNT | 100 |
| TAX | 390 |
| TOTAL | 1690 |

FIG. 3A

Marsh Technologies

Name: Barbara
Street Address: 2184 Meadow View Drive
City, State: Hartford, CT
Zip Code: 6103
Phone: 860-473-4679
E-mail: sjyyihpy91k@temporary-mail.net

MEDICAL EXPERT WITNESS INVOICE

Invoice # [No] 527896454     Date: August 19, 2021

Client / Customer
Name: Merrilee R Asbury
Street Address: 2184 Meadow View Drive
City, State: Hartford, CT
Zip Code: 6103

| Description | Hours | $ / Hours | Amount ($) |
|---|---|---|---|
| Oxygen Ventilation | 24 | 10 | 240 |
| AC room | 48 | 20 | 960 |
|  |  |  |  |
|  |  |  |  |
|  |  |  |  |
|  |  |  |  |
|  |  |  |  |
|  |  |  |  |
|  |  |  |  |
|  |  |  |  |
|  |  |  |  |
|  |  |  |  |

[Comments or Special Instructions]

Payment is due within [Number (#)] days.

| | |
|---|---|
| SUBTOTAL | 1200 |
| DISCOUNT | 100 |
| TAX | 330 |
| TOTAL | 1430 |

FIG. 3B

The White Rabbit

Name: Michelle
Street Address: 817 Morgan Street
City, State: Vernon, FL
Zip Code: 32462
Phone: 850-535-5428
E-mail: 7z8e296j2c@temporary-mail.net

MEDICAL EXPERT WITNESS INVOICE

Invoice # [No] 784687744

Date: August 19, 2021

Client / Customer
Name: Miranda T Barber
Street Address: 817 Morgan Street
City, State: Vernon, FL
Zip Code: 32462

| Description | Hours | $ / Hours | Amount ($) |
|---|---|---|---|
| Endoscopy | 2 | 100 | 200 |
| Bed Charges | 120 | 10 | 1200 |

[Comments or Special Instructions]

Payment is due within [Number (#)] days.

| | |
|---|---|
| SUBTOTAL | 1400 |
| DISCOUNT | 100 |
| TAX | 390 |
| TOTAL | 1690 |

FIG. 6B

Marsh Technologies

Name: Barbara
Street Address: 2184 Meadow View Drive
City, State: Hartford, CT
Zip Code: 6103
Phone: 860-473-4679
E-mail: sjyyihpy91k@temporary-mail.net

MEDICAL EXPERT WITNESS INVOICE

Invoice # [No] 527896454

Date: August 19, 2021

Client / Customer
Name: Merrilee R Asbury
Street Address: 2184 Meadow View Drive
City, State: Hartford, CT
Zip Code: 6103

| Description | Hours | $ / Hours | Amount ($) |
|---|---|---|---|
| Oxygen Ventilation | 24 | 10 | 240 |
| AC room | 48 | 20 | 960 |

[Comments or Special Instructions]

Payment is due within [Number (#)] days.

| | |
|---|---|
| SUBTOTAL | 1200 |
| DISCOUNT | 100 |
| TAX | 330 |
| TOTAL | 1430 |

MEDICAL EXPERT WITNESS INVOICE

Name:
Street Address:
City, State:
Zip Code:
Phone:
E-mail:

Invoice # [No]

Date: August 19, 2021

Client / Customer
Name:
Street Address:
City, State:
Zip Code:

| Description | Hours | $ / Hours | Amount ($) |
|---|---|---|---|
| | | | |

[Comments or Special Instructions]

Payment is due within [Number (#)] days.

SUBTOTAL )0
DISCOUNT 100
TAX
TOTAL )

| PLEASE DO NOT STAPLE IN THIS AREA | ‖‖‖‖‖‖‖‖‖‖‖‖‖‖‖‖‖‖‖‖‖‖‖‖‖ | Man |
|---|---|---|
| ☐☐ PICA | 0 1 2 3 4 5 6 7 8 9 2 | HEALTH |

| 1. MEDICARE ☒ (Medicare #) | MEDICAID ☐ (Medicaid #) | CHAMPUS ☐ (Sponsor's SSN) | CHAMPVA ☐ (VA File #) | GROUP HEALTH PLAN ☐ (SSN or ID) | FECA BLK LUNG ☐ (SSN) |
|---|---|---|---|---|---|

| 2. PATIENT'S NAME (Last Name, First Name, Middle Initial) Arnold Strong | 3. PATIENT'S BIRTH DATE MM ┆ DD ┆ YY | SEX M ☒  F ☐ |
|---|---|---|

| 5. PATIENT'S ADDRESS (No , Street) 546, Fleet St. | 6. PATIENT RELATIONSHIP TO INSURED Self ☒  Spouse ☐  Child ☐  Other ☐ |
|---|---|
| City  Bombay      STATE MH | 6. PATIENT STATUS Single ☒  Married ☐  Other ☐ |
| ZIP CODE 55    TELEPHONE (Include Area Code) (003) 555-3333 | Employed A  Full-Time Student ☐  Part-Time Student ☐ |

| 9. OTHER INSURED'S NAME (Last Name, First Name, Middle Initial) Boris Becker | 10. IS PATIENT'S CONDITION RELATED TO |
|---|---|
| a. OTHER INSURED'S POLICY OR GROUP NUMBER 465434 | a. EMPLOYMENT? (CURRENT OR PREVIOUS) ☒ YES  ☐ NO |
| b. OTHER INSURED'S DATE OF BIRTH MM ┆ DD ┆ YY   SEX 23 ┆ 06 ┆ 1952   M ☒  F ☐ | b. AUTO ACCIDENT    PLACE ☐ YES  ☒ NO |
| c. EMPLOYER'S NAME OR SCHOOL NAME Bollywood | c. OTHER ACCIDENT ☐ YES  ☒ NO |
| d. INSURANCE PLAN NAME OR PROGRAM NAME Prime | 10a. RESERVED FOR LOCAL USE |

READ BACK OF FORM BEFORE COMPLETING & SIGNING THIS FORM
12. PATIENT'S OR AUTHORIZED PERSON'S SIGNATURE: I authorize the release of any medical or other information needed to process this claim. I also request payment of government benefits either to myself of to the party who accepts assignment below.
SIGNED _____ DATE  08-04-2020

| 14. DATE OF CURRENT: MM ┆ DD ┆ YY 12 ┆ 04 ┆ 20 | ILLNESS (First Symptom) OR INJURY (Accident OR PREGNANCY(LMP) | 15. IF PATIENT HAS HAD SAME OR SIMILAR ILLNESS, GIVE FIRST DATE MM ┆ DD ┆ YY 12 ┆ 04 ┆ 20 |
|---|---|---|
| 17. NAME OF REFERRING PHYSICIAN OR OTHER SOURCE | | 17a. I.D. NUMBER OF REFERRING PHYSICIAN |
| 19. RESERVED FOR LOCAL USE | | |
| 21. DIAGNOSIS OR NATURE OF ILLNESS OR INJURY (RELATE ITEMS 1, 2, 3 OR 4 TO ITEM 24E BY LINE) | | |

ARABIC DOCUMENT

FIG. 11F

SYSTEMS AND METHODS FOR INTELLIGENT ZONAL RECOGNITION AND AUTOMATED CONTEXT MAPPING

RELATED APPLICATIONS

This application is a continuation of, and claims a benefit of priority under 35 U.S.C. 119 from, U.S. Patent Application No. 63/313,776, filed Feb. 25, 2022, entitled "SYSTEMS AND METHODS FOR INTELLIGENT ZONAL RECOGNITION AND AUTOMATED CONTEXT MAPPING," which is fully incorporated herein by reference for all purposes.

TECHNICAL FIELD

This disclosure relates generally to document processing. More particularly, this disclosure relates to systems and methods for recognizing zones in structured or semi-structured documents. Even more specifically, this disclosure relates to the recognition and association of zones for keys and values in a type of document from a minimal number of example documents of that type, and matching those recognized zones to a defined context.

BACKGROUND

In the modern world, the vast majority of documents that are being created, utilized, and maintained are in electronic format. It is often necessary for companies to extract information from various types of these documents and to enter this information in their own data systems so that they can use the information for various enterprise operations and processes. In particular, many enterprises have set up workflows or other processing associated with such documents based on a defined context.

What is desired therefore, are systems and methods for efficient automated determination of data in documents and the automated association of that data with such a context.

SUMMARY

As mentioned above, the vast majority of documents that are being created, utilized, and maintained are in electronic format. The documents may be generated from a computer application, and thus are native electronic documents, or may be paper documents that have been converted into electronic format, such as by scanning or the like. Some of these documents may be structured or semi-structured documents (i.e., documents where the meaning of at least part of the document is identified or a location of meaningful data may be identified) where those documents may be in a binary or non-textual type of format such as print stream format or images. It is often necessary for companies to extract information from various types of these documents (e.g., invoices, purchase orders, correspondences, shipping manifests, etc.), and to enter this information in their own data systems so that they can use the information for various enterprise operations and processes.

In particular, many enterprises have set up workflows or other processing associated with such documents, where those workflows may be implemented, for example, in conjunction with their Back Office Systems (BOS) or Line Of Business (LOB) systems. These workflows (or the BOS or LOB systems) may thus have an associated context definition. This context definition may define (e.g., associate metadata such as a label) the type of data expected in such documents. For example, a context definition for a workflow (or otherwise) may include the label "Name" for name data associated with a particular document, the label "Address" for residency data, etc.

This context definition may thus be used in defining such workflows or other processing. For example, the labels may be used to define how values determined for those labels for a document should be handled in such a defined workflow. Thus, to continue with the above example, a workflow may be defined that defines actions on the "Name" associated with a document. When processing documents, name data may be extracted from a document, and associated with the label "Name" in the context for that document such that when the document is processed through the workflow the defined action for the label "Name" may be performed on the name data (e.g., associated with the "Name" label) extracted from the document.

Specially, in most cases, when a document associated with a defined workflow is received a key (e.g., metadata) in the document (e.g., "Last Name", "First Name", etc.) associated with the label defined in the context (e.g., "Name") may be determined in the document and a value for that key (e.g., "Joe Strummer") extracted from the document and associated with the context label such that a context for that document may include the values extracted from the document. The document can then be processed using that workflow based on the context as defined for that particular document.

As will be realized, it may be desirable to process many different types of documents through the same workflow. These different types of documents may, however, define their data differently. In other words, they may utilize different keys for the same type of values. For example, invoices from one company (e.g., one document type) may use the key "Patient Name" for name related data in their invoices while invoices from another company (e.g., another document type) may use the key "Purchaser Name" for name data in their invoices.

Historically, then, to capture the format of these different types of documents (e.g., to be able to process these different types of documents using a workflow), a user had to manually read a document of a particular document type, manually read a context definition, manually enter the keys used for a particular document type into their system, evaluate the keys in the document and the context definition (e.g., labels), and manually associate the keys used in that document type with the appropriate context (e.g., labels) of a context definition. Such a manual process can be a tedious, costly, time consuming and error-prone task. Moreover, to determine where values for those keys should be extracted a user had to manually "markup" an example document to create a template to define the zones where values for those keys should be extracted.

FIG. 1 depicts this type of technique. Documents are received from various sources such as through email, fax or scanned through other capture devices. A user analyzes such documents (e.g., the images of such documents) to manually enter such information in BOS or LOB systems, or to manually markup such documents to define zones where keys or values can be found.

As such techniques are manual and quite inefficient from a time and human involvement perspective, certain automated computer-based techniques have been developed to assist in key and value recognition in documents, and the automated handling of such documents. These automated techniques have heretofore also proved inadequate. As an example, many of these techniques may require optical character recognition (OCR) to be performed on documents (e.g., images) and to thereby generate digital data from the images. The strings of recognized characters can be processed according to a predetermined set of algorithms to identify information that is represented by the character strings. These types of techniques usually require OCR to be performed on each document it is desired to process, and to be performed on the entirety of the document. These types of approaches are consequently quite resource intensive and inefficient, consuming a large amount of computing time and memory or other resources.

Other computer-based techniques may utilize machine learning to assist in key and value recognition from certain document types. These types of techniques are also disadvantageous as they usually require the processing of a large corpus of training documents and, additionally, may also require OCR of those documents (e.g., to determine features or values to utilize in the training of these machine learning models). As a result these types of approaches may also be computer resource intensive and inefficient, requiring huge amount of data and computing time to train such a machine learning model.

Accordingly, there is constantly a need for efficient systems and methods for document processing to allow automated zonal recognition for key and values, the association of such key zones and value zones, and the automated association of those key zones with a context definition. To those ends, among others, attention is directed to embodiments of the document processing systems disclosed here for intelligent zonal recognition and context mapping. Such embodiments may utilize image processing and heuristic techniques to determine key zones from a minimal set of example documents of a document type. In fact, in some embodiments only two documents of a document type may be utilized to determine key and value zones (and values from those zones) for a document type, and to map those key zones to a context definition.

A context definition is an informational definition of data of interest. Such a context definition may have a set of context field definitions where each context field definition may include a label (e.g., a textual label) or other metadata defining that context field (e.g., "Name", "Amount", etc.). Such a context definition may be utilized in the processing of documents. Embodiments as disclosed may allow the automated recognition of zones for keys and values and the automated association of those key zones with context fields of a context definition.

In one embodiment, a document processing system may receive an example set of documents of a document type (e.g., actual documents or sample documents), where these documents may be in an image format, along with a contextual definition to which it is desired to map the keys (e.g., key zones) or value zones of that document type. The document processing system may include a zonal recognition engine that determines a set of key zones where keys (also referred to as fields) are present (e.g., located) in the document type and a set of value zones where values associated with those keys are present (e.g., located) in documents of that type. The key zones or value zones may be defined by coordinates for the respective zones (zonal coordinates).

The zonal recognition engine can also extract the keys from the identified key zone (e.g., the text or other data within the key zone) and the values from identified value zones. The key zones can then be associated with zero or more context field definitions of the context definition based on a comparison of the key (e.g., the text or other data extracted from that key zone) with the context definition. In this manner, the returned data may convey, for example, a bipartite mapping between key zones and a context definition or a tripartite mapping between value zones (or values themselves), key zones, and the context definition. The zonal coordinates for the key zones and value zones, along with the keys and values themselves, the mappings between the key and value zones or the mapping between the key zones and context field definitions may then be provided for use in further processing of such documents. As but one example, these mappings (and the corresponding zonal coordinates) can be used, for example, as a template for the processing of future documents (e.g., during a capture or extraction process) of that document type (or to generate such a template), where that template can be used to create a context for that document for use in a workflow (or other processing) to be performed on that document.

As can be seen then, embodiments of document processing systems may intelligently recognize and capture sections and their variables from structured and semi-structured documents and matching them with the context as defined with respect to other computing systems. As such, embodiments as disclosed can be used, for example, to capture data seamlessly from a set of given structured or semi-structured documents, or as a service which can be utilized by external applications or systems that process such document to determine the key zones or value zones for a document type and a mapping between those key zones and a context definition used by such systems to process these documents.

Embodiments as disclosed may thus provide a number of advantages over existing solutions. Specifically, existing solutions are incapable of mapping keys and their (key) zones to a (e.g., previously defined) context definition where that context definition may be, for example, defined by a user or obtained from another system, and are similarly incapable of mapping value zones to key zones to such context definitions such that computing system may be provided data relevant to where data associated with that context may be extracted from a particular document type. Embodiments as disclosed may provide an efficient mechanism to perform such mappings using image processing on a minimal number of documents, including heuristic processing of the images of those documents. By accomplishing such mapping using image processing on a minimal number of documents, much of the processing may be done on a reduced set of binary image data (e.g., with values 0-255) as opposed to complex data such as the produced by OCR. Moreover, as zones (e.g., key or value zones) may be identified prior to any such extraction (e.g., OCR) being performed on any identified zones, extraction such as OCR may be limited to only certain zonal coordinates and only on particular images. Such techniques may therefore eliminate the need to process a large number of documents using resource intensive techniques such as OCR, or to train machine learning models.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIGS. 3A and 3B depict example documents and associated key and value zones.

FIGS. 6B-6G are example images.

FIGS. 9A-9C are graphical depictions of an embodiment of determining zones in a neighborhood.

FIGS. 11E and 11F depict example documents depicting different document orientations.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Before describing embodiments in more detail it may be useful to briefly give some additional context regarding embodiments. As discussed, there is a need for efficient systems and methods for document processing to allow automated zonal recognition for keys and values, the association of such key zones and value zones, and the automated association of those key zones (or key zones and value zones) with a context definition. To those ends, among others, attention is directed to embodiments of document processing systems for intelligent zonal recognition and context mapping disclosed herein. Such embodiments may utilize image processing and heuristic techniques to determine key zones from a minimal set of example documents of a document type. In certain embodiments, for example, only two documents of a document type may be utilized to determine key and value zones (and values from those zones) for a document type, to map key zones to value zones, and to map those key zones to a context definition.

A context definition may be an informational definition of data of interest. Such a context definition can have a set of context field definitions where each context field definition may include a label (e.g., a textual label) or other metadata defining that context field (e.g., "Name", "Amount", "Invoice No.", etc.). Such a context definition may be input by a user to the document processing system or may be obtained from a BOS or LOB (or other) system. For example, such a context definition may be associated with a workflow or other document processing or storage definition at a system and may be obtained through an interface at such a system, or otherwise obtained. Embodiments as disclosed may allow the automated recognition of zones for keys and values and the automated association of those key zones with context fields of a context definition.

Figure 1:
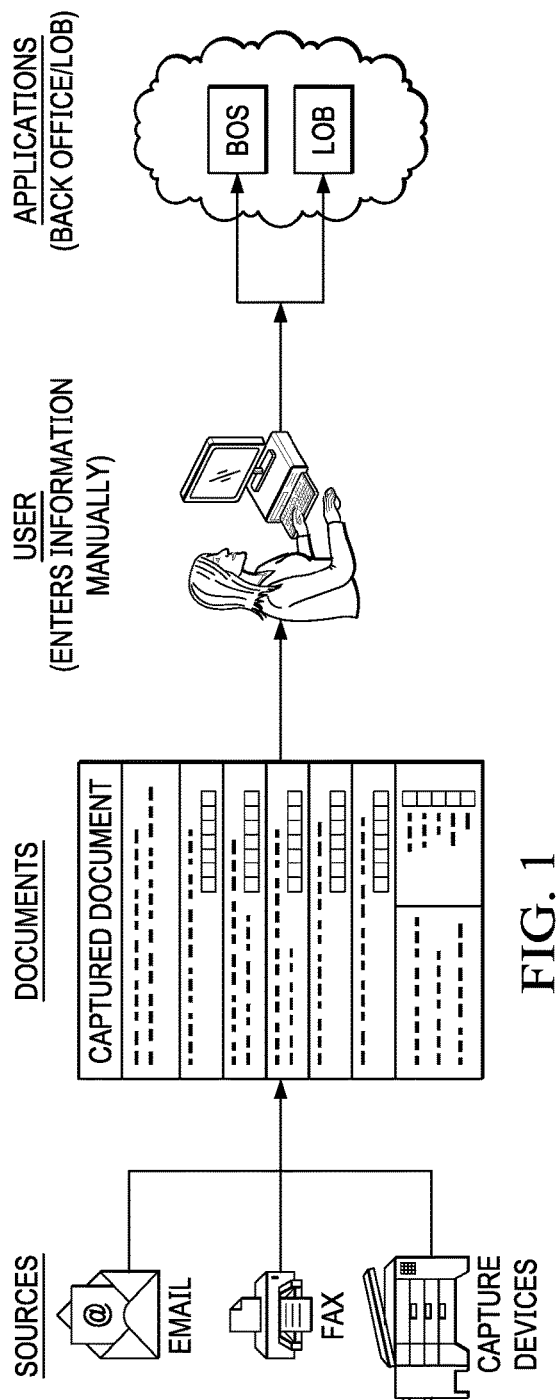
FIG. 1 is a block diagram of manual document processing and manual context association.
Figure 2:
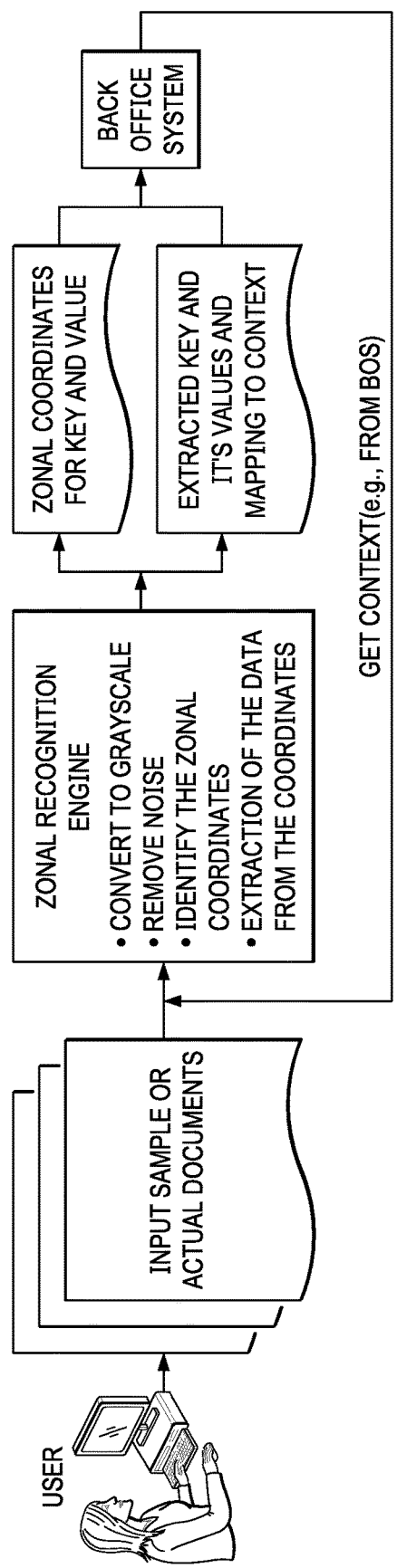
FIG. 2 is a block diagram of the automated efficient document processing and context association according to an embodiment.

The operation of one embodiment of document processing systems as disclosed is depicted in FIG. 2. A document processing system may receive an example set of documents of a document type (e.g., actual documents or sample documents), where these documents may be in an image format, along with a contextual definition to which it is desired to map the keys (e.g., key zones) or value zones of that document type. The document processing system may include a zonal recognition engine that preforms image processing techniques on the set of example documents to determine a set of key zones where keys (also referred to as fields) are present (e.g., located) in the document type and a set of value zones where values associated with those keys are present (e.g., located) in documents of that type. The image processing techniques may include, for example, conversion of each of the images to a greyscale image and noise removal from the images, differencing of images, or aggregation of images. The key zones or value zones may be defined by coordinates for the respective zones (zonal coordinates).

The zonal recognition engine can also extract the keys from the identified key zone (e.g., the text or other data within the key zone) and the values from identified value zones. To perform such extraction, OCR may be utilized. The key zones can then be associated with zero or more context field definitions of the context definition based on a comparison of the key (e.g., the text or other data extracted from that key zone) with the context definition. The zonal coordinates for the key zones and value zones, along with the key and values themselves and the mapping between the keys and the context field definitions may then be provided for use in further processing of such documents.

For example, data on the key or value zones, data on the keys or values included in those zones in the example documents, data on the mappings between the key zones and values zones or mappings between key zones and the context field definitions, or other data, may be provided in a data object (e.g., a JavaScript Object Notation (JSON) or eXtensible Markup Language (XML) or some other data format data object) such that the data may be consumed by other computing applications or systems. In this manner, the returned data may convey, for example, the key zones or value zones (e.g., a location of the keys and values in a document type), the keys or values themselves, a bipartite mapping between key zones and a context definition, a tripartite mapping between value zones (or values themselves), key zones, and the context definition or other data related to the key zones.

This data object may be returned to a BOS or LOB (or other) system from which the context definition was originally obtained such that these systems may utilize this data (e.g., the mappings between the key zones and context field definitions or the mappings between the context field definitions, key zones, and value zones) for future processing of documents of that document type. As can be seen then, embodiments of document processing systems may intelligently recognize and capture sections and their variables from structured and semi-structured documents, and matching them with the context as defined with respect to other computing systems (e.g., BOS or LOB systems). As such, embodiments as disclosed can be used, for example, to capture data seamlessly from a set of given structured or semi-structured documents, or utilized by external applications or systems that process such document to determine the key zones or value zones for a document type and a mapping between those key zones and a context definition used by such systems to process these documents.

It may now be helpful to look at an example of two example documents of a document type. Referring to FIGS. 3A and 3B then, example documents of an medical expert witness invoice document type are depicted. In FIGS. 3A and 3B example keys are boxed in dashed lines while example values associated with those keys are boxed in solid lines. As will be understood these are only examples of keys and values presented on each of these example documents that have been identified for purposes of example and discussion, other keys and values are present on these example documents and have not been identified as such. Thus, notice with respect to FIGS. 3A and 3B that documents of the same type may include the same or similar keys (or fields) that identify a type of the key (or what type of values will be associated with that key). For example, each document has a "Name" key, each document has a "Phone" key, each document has a "Invoice #[No]" key, each document of that document type has a "Description" and "Hours" key, etc. Notice as well that each of those keys is associated with one or more values, where those values may be different across documents of that document type. For example, the value associated with the "Name" key in the document in FIG. 3A is "Michelle" while the value associated with the "Name" key in the document of FIG. 3B is "Barbara."

Figure 3C:
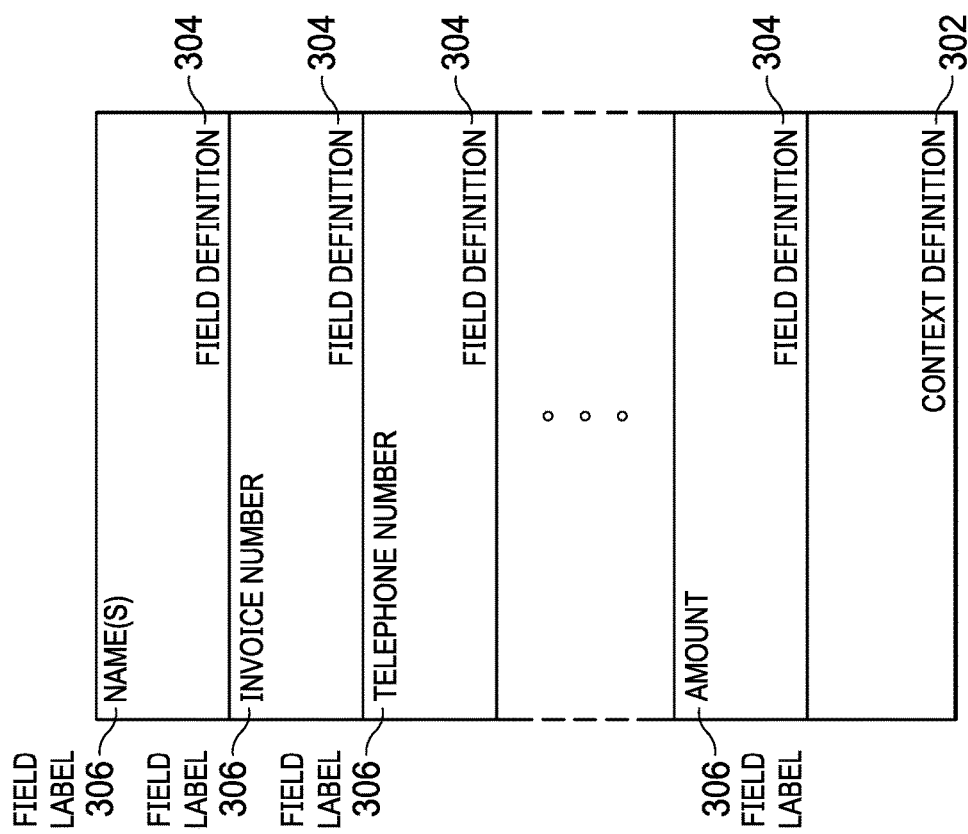
FIG. 3C is a block diagram of one embodiment of a context definition.

As has been discussed, it may be desired to process documents of a document type (or documents of multiple document types) in various scenarios. One scenario involves the processing of incoming documents of a document type using a workflow. A context definition may thus be used in defining such workflows or other processing for documents. For example, the labels may be used to define how values determined for those labels for a document should be handled in such a defined workflow. FIG. 3C depicts an example of a context definition. A context definition 302 may have multiple field definitions 304, each context field definition 304 defining a (field) label 306 for a type of data that may be present in a document being processed. Here, a first field definition 304 may include a label 306 "Name(s)", a second field definition may include a label "Invoice Number", a third field definition 304 may include a label 306 "Telephone No." etc.

Such a context definition 302 may be used in defining processing (e.g., workflows) for invoice documents Thus, to continue with the above example, a workflow may be defined that defines actions on the "Name(s)" associated with a context for document. When processing documents, name data may be extracted from a document, and associated with the label "Name(s)" in the context for that document such that when the document is processed through the workflow the defined action for the label "Name(s)" may be performed on the name data (e.g., associated with the "Name(s)" label) extracted from the document. Similarly, a workflow may be defined that defines actions on the "Invoice Number" associated with a context for document. When processing documents, invoice identifier data may be extracted from a document, and associated with the label "Invoice Number" in the context for that document such that when the document is processed through the workflow the defined action for the label "Invoice Number" may be performed on the invoice identifier data (e.g., associated with the "Invoice Number" label), etc.

As will be realized, it may be desirable to process many different types of documents using the same context definition 304. These different types of documents may, however, define their data differently. In other words, they may utilize different keys for the same type of values. For example, invoices from one source (e.g., one document type) may use the key "Name" for name related data in their invoices while invoices from another source (e.g., another document type) may use the key "Purchaser Name" for name data in their invoices, etc. An invoice from one source may utilize the key "Invoice #[No]" for invoice identifier data while an invoice from another source may utilize the key "Invoice No." for invoice identifier data, etc.

As a result, the keys in documents it may be desired to process using a context definition may not utilize keys that are identical (or even that similar) to the labels 306 for field definitions 304 in the context definition 302 that it is desired to use to process such documents. In the example illustrated for instance, the documents of FIG. 3A and FIG. 3B use the key "Name" for name related data (e.g., instead of the "Name(s)" label 306 as in the context definition 302), and the key "Invoice #[No]" for invoice identifier data (instead of the "Invoice Number" label 306 as in the context definition 302). In fact, in many cases, such context definitions may be defined well in advance of knowledge of, or access to, particular document types or may have been defined in association with one more other document types, but may still be desired to utilize the same context definition to process similar document types from multiple source.

As mentioned previously then, efficient systems and methods for document processing to allow automated zonal recognition for key and values, the association of such key zones and value zones, and the automated association of those key zones with a context definition are desired. To those ends, among others, attention is directed to embodiments of the document processing systems disclosed here for intelligent zonal recognition and context mapping.

Such embodiments may utilize image processing and heuristic techniques to determine key zones from a minimal set of example documents of a document type. In fact, in some embodiments only two documents of a document type may be utilized to determine key and value zones (and values from those zones) for a document type, and to map those key zones to a context definition.

Figure 4:
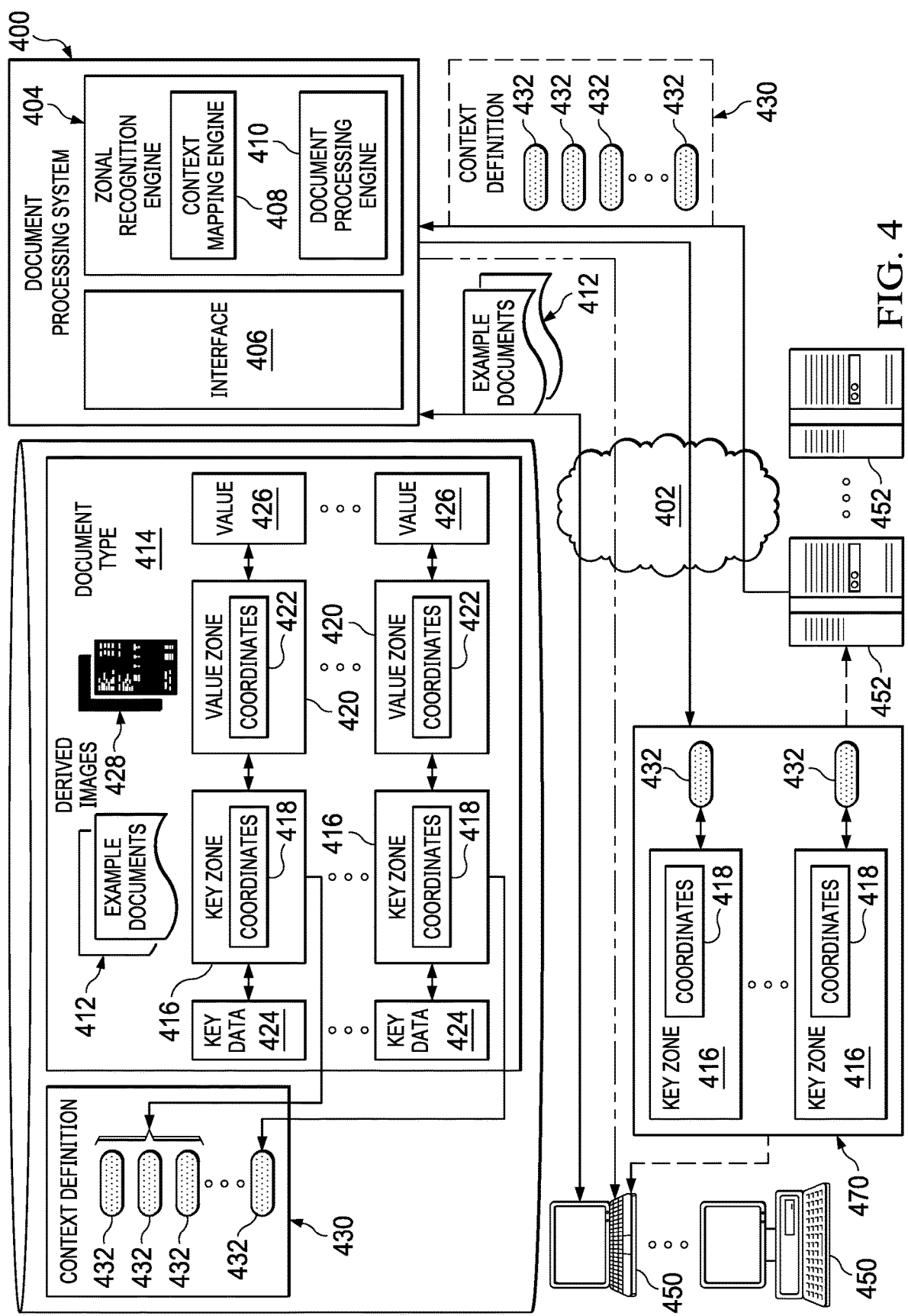
FIG. 4 is a block diagram of one embodiment of a document processing system for zonal recognition and context mapping.

FIG. 4 is a block diagram of one embodiment of just such a document processing system 400. Here, document processing system 400 may be a coupled to one or more user computing devices 450 or other computing systems 452 over computer network 402 or combination of computer networks, such as the Internet, an intranet, an internet, a Wide Area Network (WAN), a Local Area Network (LAN), a cellular network, a wireless or wired network, or another type of network. While document processing system 400 has been depicted as a standalone computing system for ease of illustration it will be realized that such a document processing system 400 may be deployed as a cloud based application or set of services, or in another configuration without loss of generality.

Thus, document processing system 400 may offer an interface 406 such as an Application Programming Interface (API) or web service interface (e.g., a Representational State Transfer (REST) web service or other type of web services interface). A user at a computing device 450, 452 may cause a request to be issued to document processing system 400 for zonal recognition and context mapping for a document type. For example, such a request may be issued from a user using web based interface (e.g., a browser based interface) provided by the document processing system 400 or another computing system. The request for the document processing system may include, or identify (e.g., a location of) a set of example documents 412 of the document type 414. The set of example documents 412 may be in, or maybe converted to an image or print stream format such as Joint Photographic Expert Group (JPEG), Portable Network Graphic (PNG), Graphics Interchange Format, GIF a print stream in one of various print formats such as Advanced Function Printing (AFP), Scalable Vector Graphics (SVG), line data, metacode, Printer Command Language (PCL), Portable Document Format (PDF), BMP, or TIFF other raster or vector formats, or another type of image or print format. The document processing system 400 may create an entry for the document type 414 in a memory (e.g., RAM or a database or another type of computer memory) and store the set of example documents 412 in association with that entry for that document type 414.

The document processing system may also obtain a contextual definition 430 to which it is desired to map the key zones of that document type. Such a context definition may have a set of context field definitions where each context field definition 432 may include a label (e.g., a textual label) or other metadata defining that context field. Context definition 430 may be input by a user to the document processing system or may be obtained from another computing device 452 (e.g., such as a BOS or LOB system where that context is defined). For example, a context definition 430 may be associated with a workflow or other document processing or storage definition at a computing system 452 and may be obtained through an interface at such a system 452 or otherwise obtained. Thus, the context definition 452 may define labels (e.g., or metadata) or other data associated with processing (e.g., workflows or other processing) by a computing system independent of document processing system 400 altogether. The context definition 430 may be stored at the document processing system 400 in association with the document type 414 and associated example documents 412.

Zonal recognition engine 404 (e.g., using document processing engine 410) may then process the example documents to determine a set of key zones 416 associated with the document type 414. Each of these key zones 416 may include the corresponding coordinates 418 where that key zone 416 is located in documents (e.g., documents 412) of the document type 414.

Specifically, in one embodiment, the document processing engine 410 may preform image processing on example documents 412 to derive images 428 from the example documents, where such images may include greyscale, denoised, threshold or dilated images, or images 428 aggregated or otherwise determined from one or more derived images 428. The derived document images 428 may then be evaluated to determine one more value zones 420 associated with the document type 414. Each of these value zones 420 may include the corresponding coordinates 418 where that value zone 420 is located in documents (e.g., documents 412) of the document type 414.

To determine these value zones from the derived document images 428, images of each of the set of example documents 412 can be processed by document processing engine 410 to determine a derived image 428 comprising an aggregated difference image for the example set of documents 412. This aggregated difference image may include pixels where differences exist between the documents of the example set of documents 412. This aggregated difference image may be determined by document processing engine 410 based on pairwise difference images determined by document processing engine 410 from pairs of documents 412 and included in derived images 428. This aggregated difference image may then be processed by document processing engine 410 to determine value zones 420 for the document type 414 by determining the zonal coordinates of the differences included in the aggregated difference image. These value zones 420 and their associated zonal coordinates 422 can then be stored and associated with the document type 414.

Using the value zones 420 determined from the derived images 428, document processing engine 410 can determine the key zones 416 based on the determined value zones 420 and the derived images 428. In one embodiment, document processing engine 410 can subtract the aggregated difference image of the derived images 428 (e.g., the pixel values of the aggregated difference image) from an image of an example document 412 (e.g., the pixel values of the image of the example document). This subtraction serves to remove the (pixels of the) value zones (as contained in the aggregated difference image) from the image of the example document, leaving only pixels associated with keys in the derived subtracted image 428. This derived subtracted image may then be processed by document processing engine 410 to determine key zones 416 for the document type 414 by determining the zonal coordinates of the pixels in the derived subtracted image. These key zones 416 and their associated zonal coordinates 418 can then be stored and associated with the document type 414.

Document processing engine 410 can then map the determined key zones 416 and the value zones 420 for the document type 414. In some embodiments, each of the key zones 416 can then be mapped (i.e., associated with) a corresponding value zone 420 of the set of value zones 420 and each of the value zones 420 may be associated with a corresponding key zones 416. To perform such a mapping for a key zone document processing engine 410 may determine the value zones 420 within some neighborhood of (e.g., within some distance or having alignment with) the key zone 416 and determine a value zone 420 to map to the key zone 416 from the set of value zones 420 in the neighborhood. The mappings between the key zones 416 and the value zones 420 may be stored by the document processing engine 410.

The keys (e.g., the text or other data) associated with each key zone can be determined by document processing engine 410. To determine such a key 424 for a key zone 420, an extraction may be performed at the zonal coordinates 418 associated with that key zone 416 on an example document 412. Such an extraction may be performed by applying OCR or the like to the example document at the zonal coordinates of the key zone 416 to get key data 414 from the key zone of that example document 412. This key 424 (e.g., the data or key value extracted from the zonal coordinates identified for that key zone) can then be associated with that key zone 416. In some embodiments, the values 426 for the value zones 420 may also be extracted by preforming an extraction (e.g., applying OCR or the like) at the zonal coordinates 422 associated with each value zone 420 on each (or a subset of) example document 412.

Once the key data 424 is associated with each key zone 416, content mapping engine 408 of zonal recognition engine 408 can evaluate the key zones 420 against the obtained context definition 430 to associate key zones 416 with field definitions 432 (e.g., labels) of the context definition 430. Content mapping engine 408 compares key data 424 of a key zone 416 against the field labels or other data 432 of the context definition 430 to determine if the key zone 416 should be mapped to the context definition 430. In one embodiment, key data 424 for a key zone 420 may be evaluated against each field label 432 to determine a similarity score or other measure of comparison between the key data 424 associated with the key zone 416 and the label for the field definition 432. Based on the similarity scores or other measures of comparison between the key data 424 of the key zones 416 and the field definitions 432, the key zone 416 may (or may not) be mapped to a field definition 432 for the context definition 430 by content mapping engine 408.

Once any identified key zones 416 for the document type 414 are identified and mapped to the context definition 430, data 470 regarding the mappings may be returned (e.g., in response to the initial request to document processing system 400 through interface 406) or provided to another computing system such as another computing device 452 (e.g., such as a BOS or LOB system where that context is defined). Specifically, key zones 416 extracted from the example documents 414 (e.g., the zonal coordinates 418 of the key zone such as the edges or vertices of the key zone) may be included in the provided data 470 along with an identifier of an associated label or field definition 432 of the context definition 430 (or the actual label or field definition 432 itself). Additionally, in some cases any value zones 420 associated with each key zone 416 may also be identified along with the zonal coordinates 422 of those value zones 420. The key data 424 or values 426 associated with the key zones 416 or value zones 420 may also be included in the response data 470. As embodiments may be implemented as a service, such return data may be provided in a data format suitable for use by computing application or system such as JSON.

In this manner, the returned data 470 may convey, for example, a bipartite mapping between key zones 416 and a context definition (e.g., labels 432) or a tripartite mapping between value zones 420 (or values themselves 426) (not shown in return data 470 in this depiction), key zones 416, and the context definition (e.g., labels 432). Thus, zonal coordinates 418 for the key zones 416 and value zones 420, along with the keys (key data 424) and values 426 themselves, the mappings between the key 424 and value zones 420 or the mapping between the key zones 416 and context field definitions (e.g., labels 432) are provided in return data 470 for use in further processing of documents. As but one example, this return data 470 (e.g., mappings, corresponding zonal coordinates, etc.) can be used, for example, as a template for the processing of future documents (e.g., during a capture or extraction process) of that document type (or to generate such a template), where that template can be used to create a context for that document for use in a workflow (or other processing) to be performed on that document by computing device 452 (e.g., such as a BOS or LOB system).

Figure 5:
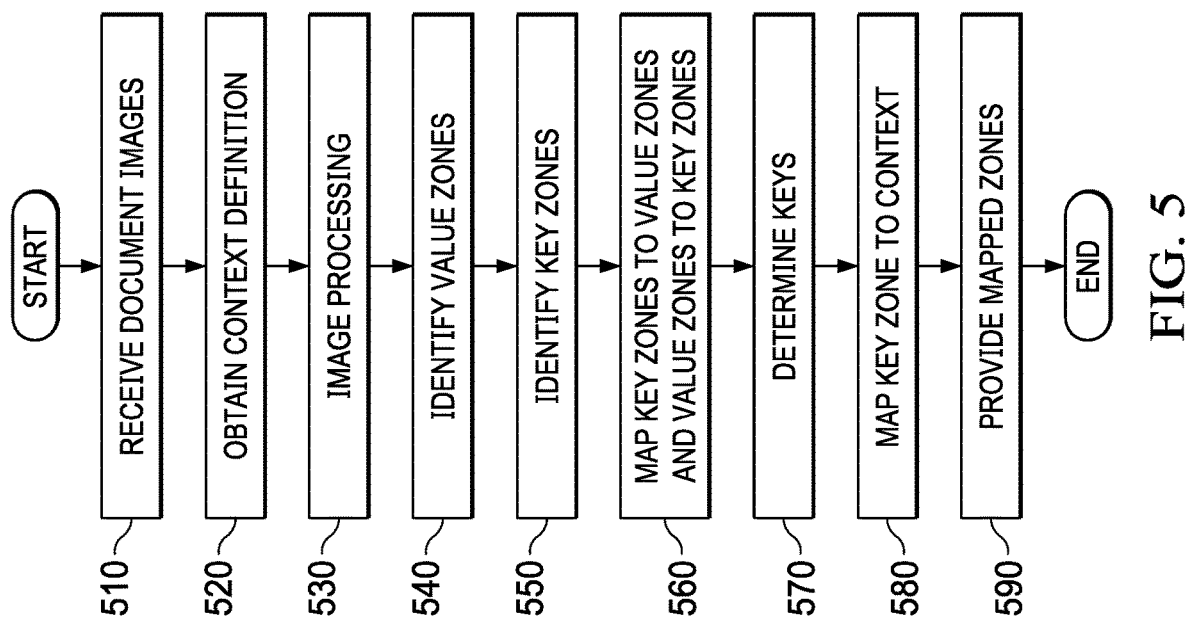
FIG. 5 is a flow diagram of one embodiment of a method for zonal recognition and context mapping.

FIG. 5 depicts one embodiment of a method for identifying keys in a document and mapping the keys to a context definition. Initially, an example set of documents of a document type (e.g., actual documents or sample documents) may be received (STEP 510), where these documents may be in an image format. This example set of documents, may include a plurality of documents including as few as two example documents. A contextual definition to which it is desired to map the keys of that document type may also be obtained (STEP 520). As discussed, a context definition is an informational definition of data of interest.

Such a context definition may have a set of context field definitions where each context field definition may include a label (e.g., a textual label) or other metadata defining that context field (e.g., "Name", "Amount", etc.). A context definition may be input by a user to the document processing system or may be obtained from a BOS or LOB system. For example, a context definition may be associated with a workflow or other document processing or storage definition at a system and may be obtained through an interface at such a system or otherwise obtained.

The images of each of the set of example documents may then be processed using image processing techniques to determine an aggregated difference image for the example set of documents (STEP 530). This aggregated difference image may include pixels (e.g., the locations of the pixels) where differences exist between the documents of the example set of documents. In certain embodiments, to process the example documents to obtain an aggregated difference image, a difference image may be obtained between each pair of example documents to obtain a pairwise difference image. These pairwise difference images can then be consolidated to form the aggregated difference image.

Using this aggregated difference image then, value zones in the document type (e.g., as represented by the example set of documents) may be determined (STEP 540). Specifically, as in most cases the keys of a document type are similarly located, such keys will not show as pixel data in the aggregated difference image. Thus, the remaining pixels (or pixel clusters) in the aggregated difference image may represent the location of the values present in the example documents (e.g., as such values may likely be different between even documents of the same type). Accordingly, the zonal coordinates of the differences included in the aggregated difference image (e.g., as represented by the pixels present in the aggregated difference images) may be determined. These zonal coordinate for a value zone may include, for example a regular defined polygon (e.g., rectangle) encompassing a set of similarly located pixels (or pixels within some threshold distance) included in the aggregated difference document. Each (e.g., distinct) set of zonal coordinates associated with a difference represented in the aggregate difference image can thus be determined to be a value zone for documents of that document type.

Using the value zones determined from the aggregated difference image, key zones for the document type can then be determined (STEP 550). As will be recalled in the finding of value zones, areas of differences between the example set of documents likely represented values, as values may often times change between documents. The opposite is the situation with respect to keys present in documents of the same type. Namely, areas of the documents that do not change between documents of the same document type likely represent the location of the keys of that document type, as such keys are usually substantially static in both content and location across documents (of the same document type).

Thus, to find key zones for the document type, the aggregated difference image (e.g., the pixel values of the aggregated difference image) can be subtracted from the image of an example document (e.g., the pixel values of the image of the example document) of the set of example documents (e.g., a randomly chosen one of the set, a first one of the set, etc.). By subtracting the values of the aggregated difference image from the image of the example document, the values in the example document (e.g., the pixels associated with those values) will be removed (e.g., their value will be zeroed or "blacked" out). Thus, what is left in the resulting "de-valued" document resulting from such a subtraction are pixels representing keys in the example document. Accordingly, the zonal coordinates of the remaining pixels in the de-valued image of the example document may be determined as key zones for the document type. These zonal coordinate for a key zone may include, for example a regular defined polygon (e.g., rectangle) encompassing a set of similarly located pixels (or pixels within some threshold distance) included in the de-valued document image. Each (e.g., distinct) set of zonal coordinates associated with a key represented in the de-valued document image can thus be determined to be a key zone for documents of that document type.

At this point then, there are a set of key zones and a set of value zones determined for the document type based on the received set of example document. These key and value zones may be mapped to one another (STEP 560). Each of the key zones can then be mapped (i.e., associated with) a corresponding value zone of the set of value zones and each of the value zones may be associated with a corresponding key zones. In one embodiment, to perform such a mapping for a key zone, the value zones within some neighborhood of the key zone may be determined and associated with the key zone. A value zone to map to the key zone may be determined from the set of value zones. In one embodiment, a ranked list of value zones to map to the key zone may be determined based on one more layout or other probabilities or weightings determined from an analysis of the example documents. Similarly, to perform such a mapping for a value zone, the key zones within some neighborhood of the value zone may be determined, and a key zone to map to the value zone may be determined. Again, in one embodiment, a ranked list of key zones to map to the value zone may be determined based on one more layout or other probabilities or weightings determined from an analysis of the example documents.

The keys (e.g., the text or other data) associated with each key zone can be determined (STEP 570). To determine such a key for a key zone, an extraction may be performed at the zonal coordinates associated with that key zone on an example document. Such an extraction may be performed by applying OCR or the like to the example document at the zonal coordinates of the key zone to get key data from the key zone of that example document. This key (e.g., the data or key value extracted from the zonal coordinates identified for that key zone) can then be associated with that key zone. In some embodiments, the values for the value zones may also be extracted by preforming an extraction (e.g., applying OCR or the like) at the zonal coordinates associated with each value zone on each example document.

Once the key data is associated with each key zone, the key zones may be evaluated against the obtained context definition to associate key zones with (e.g., field definitions or labels) of the context definition (STEP 580). Here, the key data of a key zone may be compared (e.g., through word or Natural Language Processing (NLP)) against the field labels or other data of the context definition to determine if the key zone should be mapped to the context definition. In one embodiment, key data for a key zone may be evaluated against each field label to determine an edit distance (e.g., Levenshtein distance) between the key data associated with the key zone and the label for the field definition. A key zone may be associated with, for example, a label or field definition of the context definition with the lowest Levenshtein distance (e.g., if that Levenshtein distance is below some threshold, or some other key zone is not associated with a lower edit distance, etc.).

Other comparisons may also be utilized to determine if a key zone is to be associated with a context definition (or field definition of the context definition) and to which field definition if any such a key zone should be associated. Such comparisons may include using Natural Language Processing (NLP) techniques to generate a similarity value between the key data for a key zone and the label for the field definition of the context definition, and the key zone associated with a most similar field definition of the context definition (e.g., if the similarity is above some threshold value or some other key zone is not associated with greater similarity, etc.). As another technique for making such a comparison, feature vectors may also be utilized. A vector may be generated for the key data for a key zone (e.g., using word2vec or the like) and a vector may be generated for each label for each field definition. The vector for the key data for a key zone may then be compared with the vectors generated from the labels for each field definition for the context definition. The key zone can be associated with a most similar field definition of the context definition based on the comparison of the vectors (e.g., if the similarity is above some threshold value or some other key zone is not associated with greater similarity, etc.).

Once any key zones for the document type are identified and mapped to the context definition, data regarding the mappings may be returned or otherwise provided (STEP 590). Specifically, key zones extracted from the example documents (e.g., the zonal coordinates of the key zone such as the edges or vertices of the key zone) may be included in the provided data along with an identifier of an associated label or field definition of the context definition (or the actual label or field definition itself). Additionally, any value zones associated with each key zone may also be identified along with the zonal coordinates of those value zones. Thus, for example, the ranked list of value zones determined for the key zone may be included in the returned data along with the probability or weighting for that value zone relative to that key zone, along with probabilities or weightings determined from the set of example documents. In some cases, as the actual values may also have been extracted from the (value zones of the) example documents, these values may be provided in the return data in association with those value zones. As embodiments may be implemented as a service in a computing environment, such return data may be provided in a data object suitable for use by computing application or system such as JSON. An example JSON format for such a response including mapping data for key zones and context definitions is included in the accompanying Appendix.

Figure 6A:
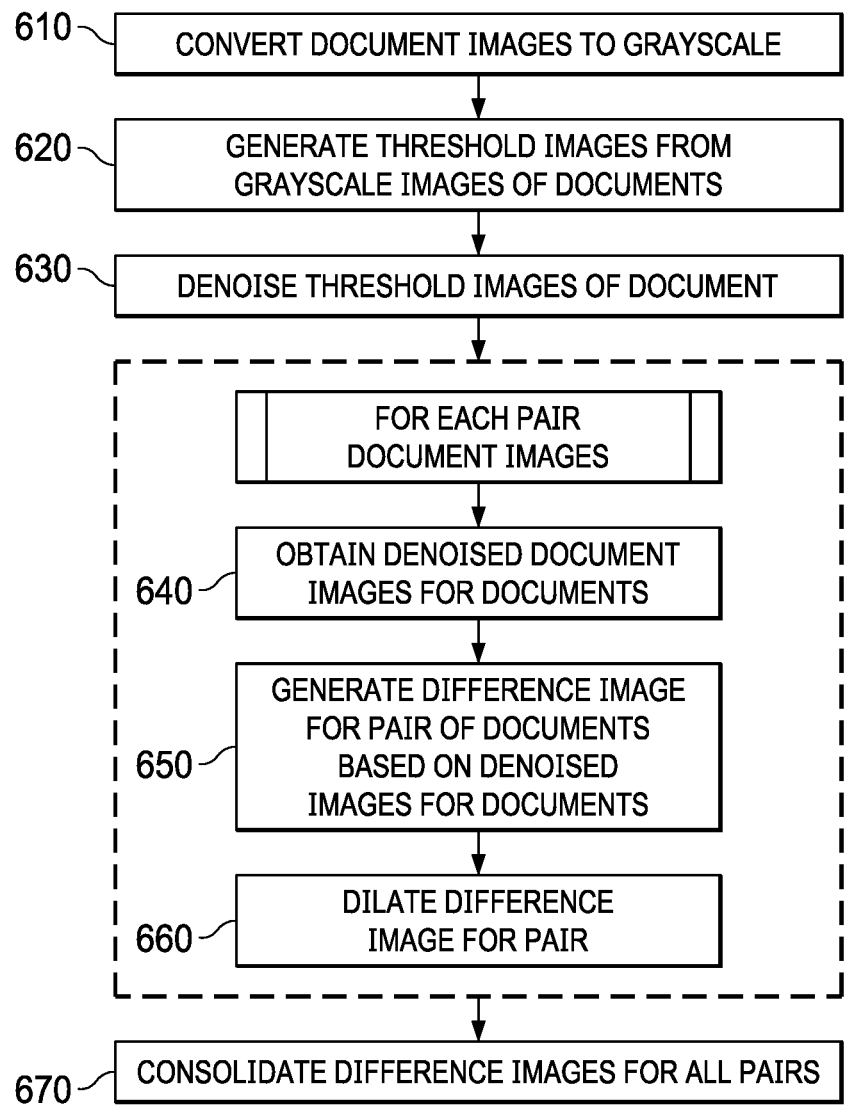
FIG. 6A is a flow diagram of one embodiment of a method for image processing.

Looking now at FIG. 6A, an embodiment of a method for image processing that may be performed by an embodiment of document processing system is depicted. Initially, when example documents are received, the images of those example documents may be converted in to greyscale images so all color from the images is removed if needed (STEP 610). Each of the greyscale images can then be converted to a threshold image, resulting in a black and white image for each example document (STEP 620). Thus, in the threshold image each pixel may have value of 255 (e.g., white) or 0 (e.g., black). Each of the black and white images can then be denoised to remove any stray pixels (or lines, etc.) (STEP 630). As an example, FIG. 6B depicts a denoised black and white image created from the example document depicted in FIG. 3A while FIG. 6C depicts a denoised black and white image created from the example document depicted in FIG. 3B.

Figure 6D:
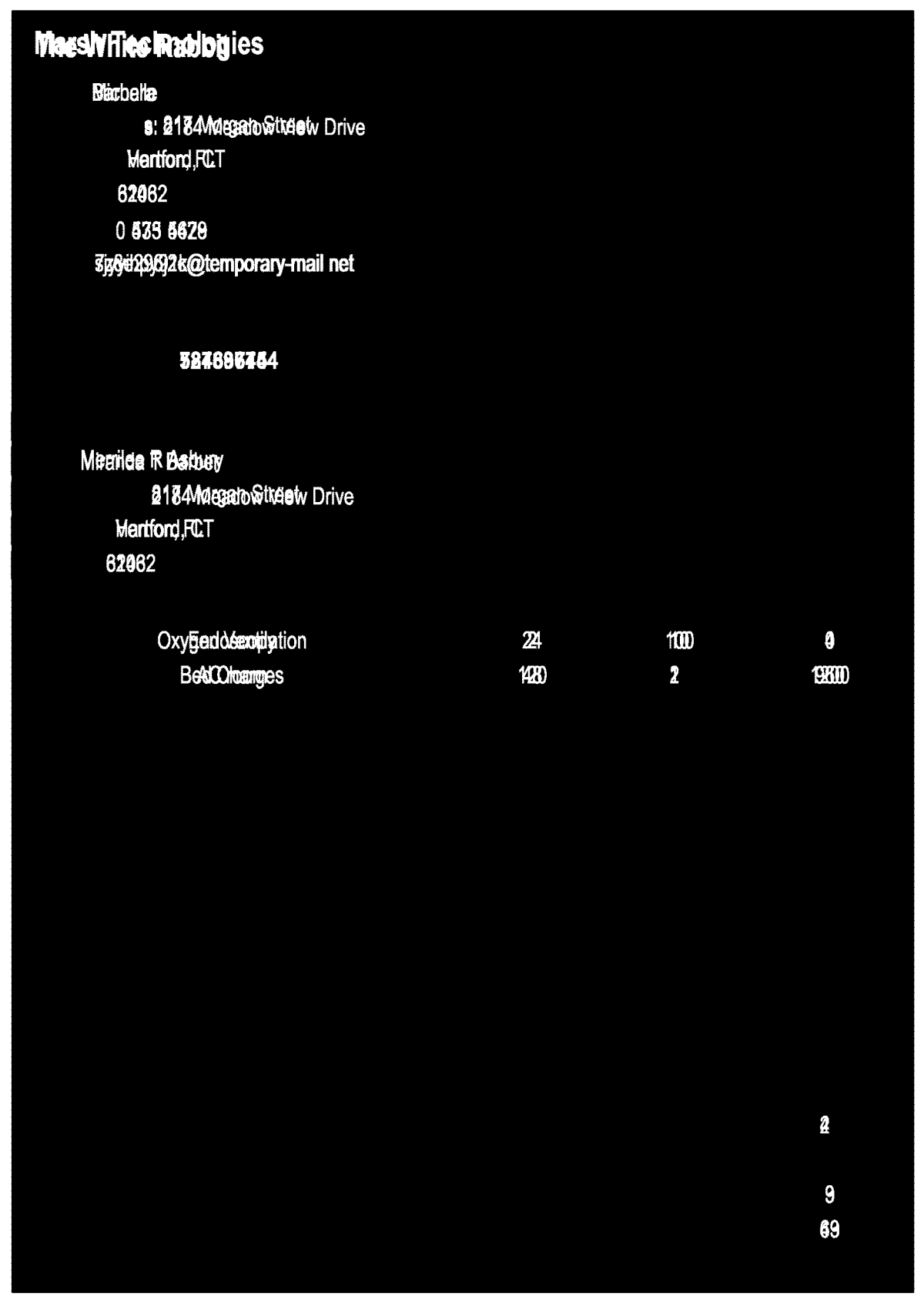

A difference image can then be generated between each pair of example documents that can be made from the example set of documents. In particular, for each pair of documents, the denoised black and white image for each document of the pair may be obtained (STEP 640) and used to generate the difference image for the pair (STEP 650) by subtracting (e.g., taking an absolute value of the subtraction) the corresponding pixel values for each of the denoised black and white images. The result of this subtraction may be a pairwise difference image having white pixels where the denoised black and white images for each example document differ and black pixels everywhere else. FIG. 6D depicts a pairwise difference image created from the denoised black and white image (depicted in FIG. 6B) created from the example document depicted in FIG. 3A and the denoised black and white image (depicted in FIG. 6C) created from the example document depicted in FIG. 3B.

Figure 6E:
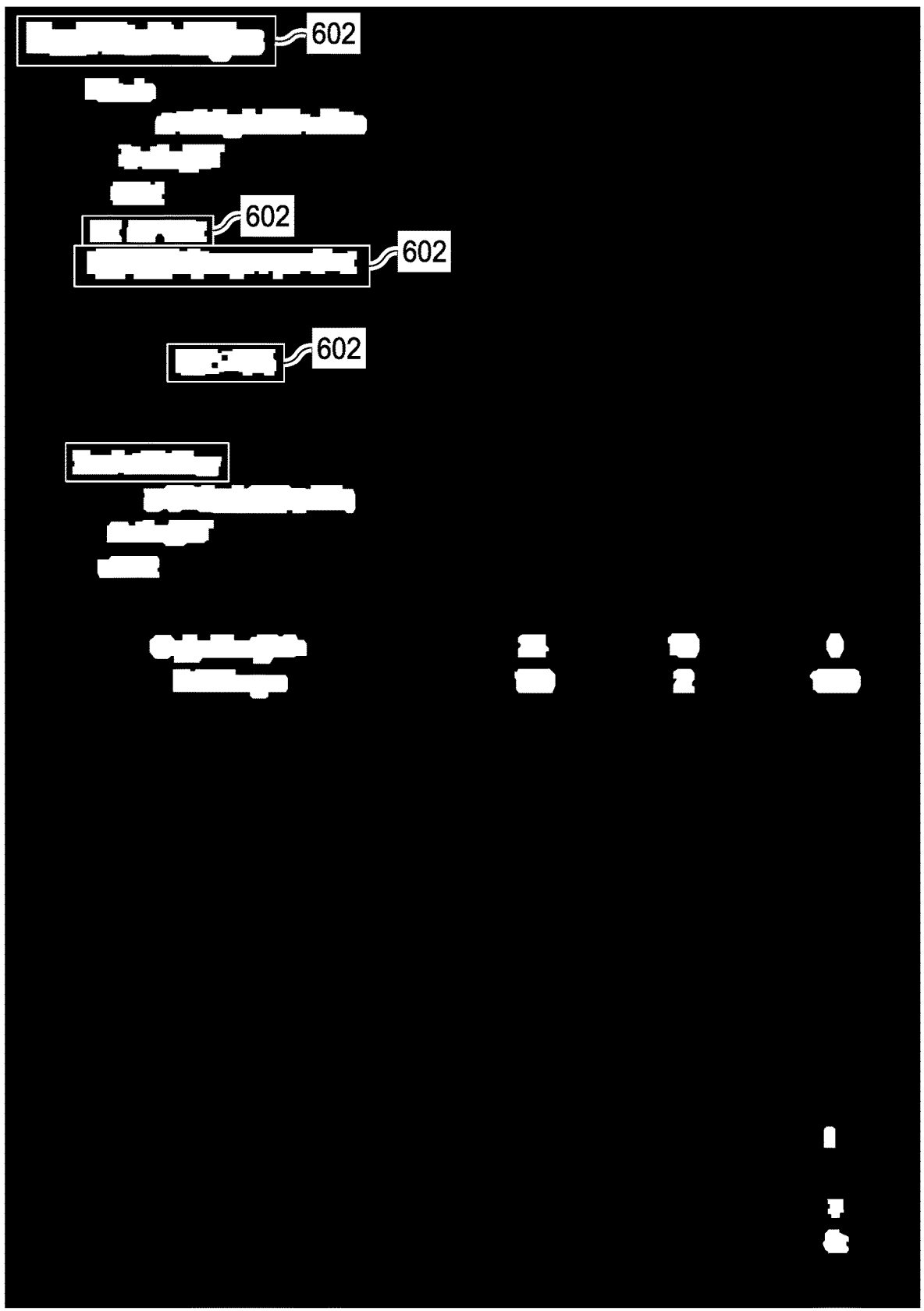

This pairwise difference image can then be dilated (STEP 660) to fill gaps between white pixels. FIG. 6E depicts a dilated pairwise difference image create from the pairwise difference image of FIG. 6D. At this point there may be a dilated pairwise difference images for each pair of example documents. The pairwise difference images for each pair of documents may then be consolidated to generate an aggregated difference image that will include pixels for all the differences between each pair of example documents (STEP 670).

Figure 7:
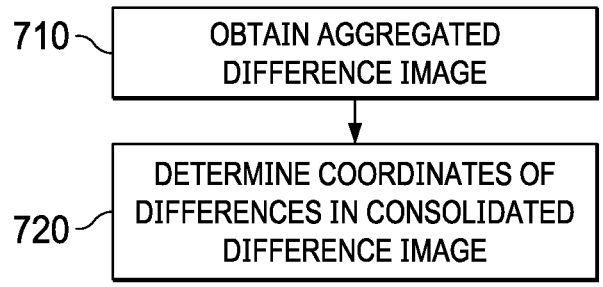
FIG. 7 is a flow diagram of one embodiment of a method for determination of value zones.

Moving on to FIG. 7, on embodiment of a method for identifying value zones within a set of example documents that may be performed by an embodiment of document processing system is depicted. Initially, an aggregated difference document associated with a set of example documents be obtained (STEP 710). This aggregated difference image may include pixels for all the differences between each pair of example documents. The pixels (or pixel clusters) in the aggregated difference image may represent the location of the values present in the example documents (e.g., as such values may likely be different between even documents of the same type). Accordingly, the zonal coordinates of the differences included in the aggregated difference image (e.g., as represented by the pixels or clusters of pixels present in the aggregated difference images) may be determined (STEP 720). Each of the zonal coordinates for a pixel cluster (e.g., a set of pixels within some threshold distance of one another) may define a value zone. These zonal coordinate for a value zone may include, for example a regular defined polygon (e.g., rectangle) encompassing a set of similarly located pixels (or pixels within some threshold distance) included in the aggregated difference document. Each (e.g., distinct) set of zonal coordinates associated with a difference represented in the aggregate difference image can thus be determined to be a value zone for documents of that document type. As an example, in FIG. 6E, certain value zones 602 that may be determined from associated pixel clusters of the aggregated difference image are depicted.

Figure 8:
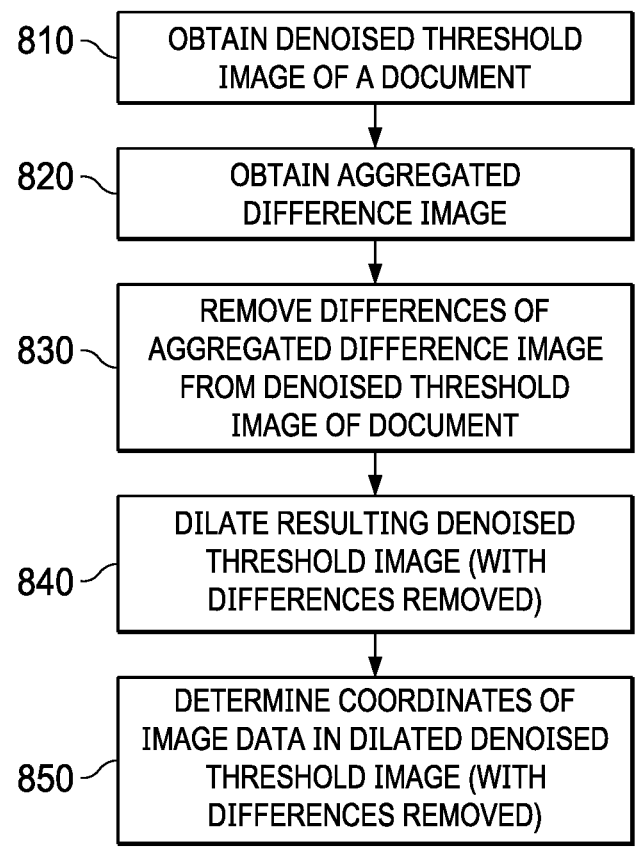
FIG. 8 is a flow diagram of one embodiment for determination of key zones.

Now referring to FIG. 8, on embodiment of a method for identifying key zones within a set of example documents that may be performed by an embodiment of document processing system is depicted. In this case, areas of the example documents that do not change between documents of the same document type likely represent the location of the keys of that document type, as such keys are usually substantially static in both content and location across documents (of the same document type).

Accordingly, to determine key zones for a document type from the example documents, a denoised threshold image of an example document (an example of which is depicted in FIG. 6C) may be obtained (STEP 810). Such a denoised threshold image for an example document may be selected based on some criteria (e.g., associated with the homage or the example document) or randomly chosen. Additionally, the aggregated difference image for the example set of documents from which the value zones were determined (an example of which is depicted in FIG. 6E) may also be obtained (STEP 820). The differences included in the aggregated difference image can then be removed from the denoised threshold image of the example document (STEP 830). For example, the aggregated difference image (e.g., the pixel values of the aggregated difference image) can be subtracted from the (denoised threshold) image of the example document (e.g., the pixel values of the image of the example document). By subtracting the values of the aggregated difference image from the image of the example document, the values in the image of the example document (e.g., the pixels associated with those values) will be removed (e.g., their value will be zeroed or "blacked" out). Thus, what is left in the resulting "de-valued" image resulting from such a subtraction are pixels representing keys in the example document. FIG. 6F depicts a de-valued image created from subtracting the aggregated difference image of FIG. 6E from the threshold denoised image of FIG. 6C.

Figure 6G:
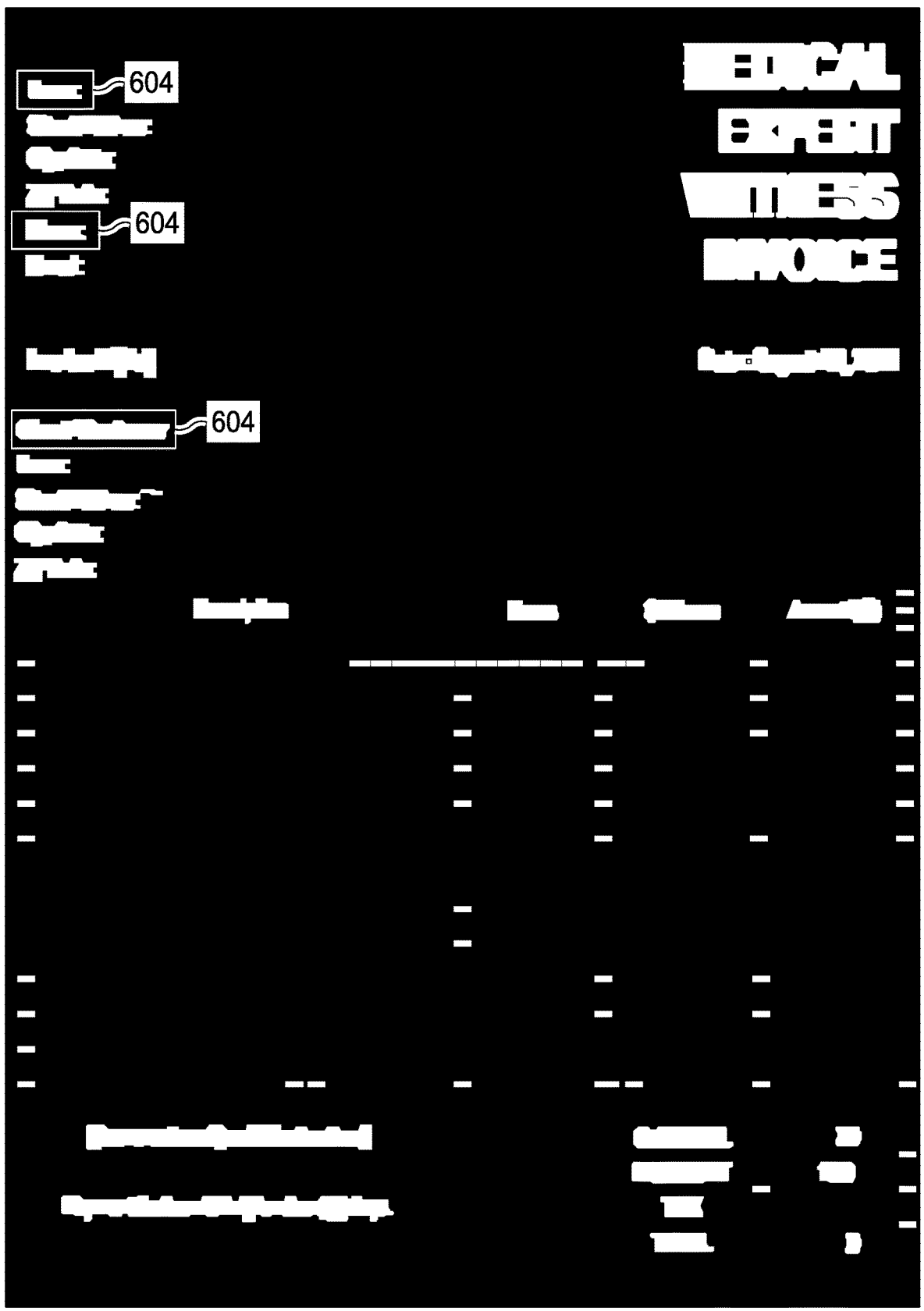

The resulting de-valued image (e.g., the threshold, denoised image of the example document with the aggregated differences removed) can then be dilated (STEP 840) to fill gaps between white pixels. FIG. 6G depicts a dilated de-valued image created from dilating the de-valued image of FIG. 6F. The pixels (or pixel clusters) in the dilated de-valued image may represent the location of keys present in the example documents (e.g., as such keys may likely be the same in documents of the same type). Accordingly, the zonal coordinates of the pixels or pixel clusters in the dilated de-valued image may be determined (STEP 850). Each of the zonal coordinates for a pixel cluster (e.g., a set of pixels within some threshold distance of one another) in the dilated de-valued image may define a key zone. These zonal coordinate for a key zone may include, for example a regular defined polygon (e.g., rectangle) encompassing a set of similarly located pixels (or pixels within some threshold distance) included in the dilated de-valued image. Each (e.g., distinct) set of zonal coordinates associated with a pixel cluster represented in the dilated de-valued image can thus be determined to be a key zone for documents of that document type. As an example, in FIG. 6G, certain value zones 604 that may be determined from associated pixel clusters of the dilated de-valued image are depicted.

As can be seen, there are thus a set of key zones and a set of value zones determined for the document type based on the received set of example document. These key and value zones may be mapped to one another. In one embodiment, each of the key zones can be mapped to a corresponding value zone of the set of value zones and each of the value zones may be associated with a corresponding key zones. To perform such a mapping for a key zone, the value zones within some neighborhoods of the key zone may be determined and associated with the key zone. A value zone to map to the key zone may be determined from the set of value zones. In some cases, a ranked or ordered list of value zones to map to the key zone may be determined based on one more layout or other probabilities or weightings determined from an analysis of the example documents. Similarly, to perform such a mapping for a value zone, the key zones within some neighborhood of the value zone may be determined, and a key zone to map to the value zone determined. Again, in one embodiment, a ranked list of key zones to map to the value zone may be determined based on one more layout or other probabilities or weightings determined from an analysis of the example documents.

Figure 9A:
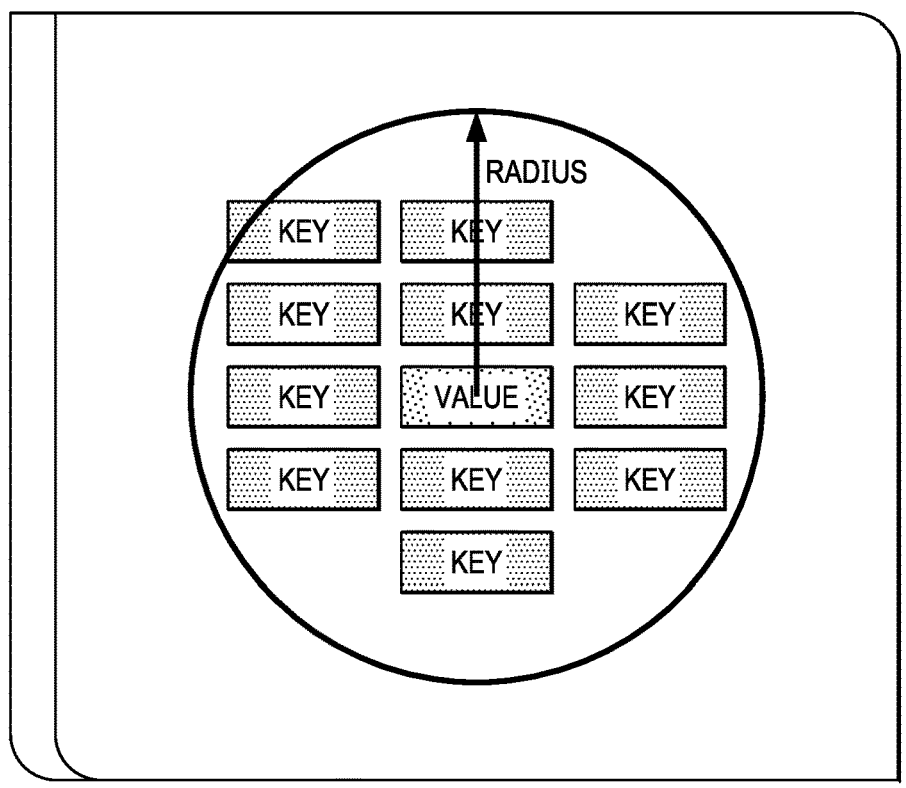

In some embodiments, a neighborhood may be defined by a distance measure between two zones. As will be recalled, a zone (e.g., a key zone or value zone) may be defined by its zonal coordinates (e.g., the edges or vertices of the zone, a centroid of the zone and a radius, etc.). Thus, to determine whether two zones are in a neighborhood of one another a distance measure may be utilized. For example, to determine all key zones within a neighborhood of a value zone, all key zones that lie within some (e.g., configurable) radius of the value zone may be determined, as depicted in FIG. 9A (where each key zone is depicted as being in the neighborhood of the value zone as they are within a radius of the value zone) and FIG. 9B. Such a radius may be determined, for example, based on the centroid of the zonal coordinates of the key zone and the value zone, based on the edge or vertex coordinates of the key zone or value zone, or using some other point or edge as defined by the zonal coordinates of the key and value zones being evaluated.

Figure 9C:
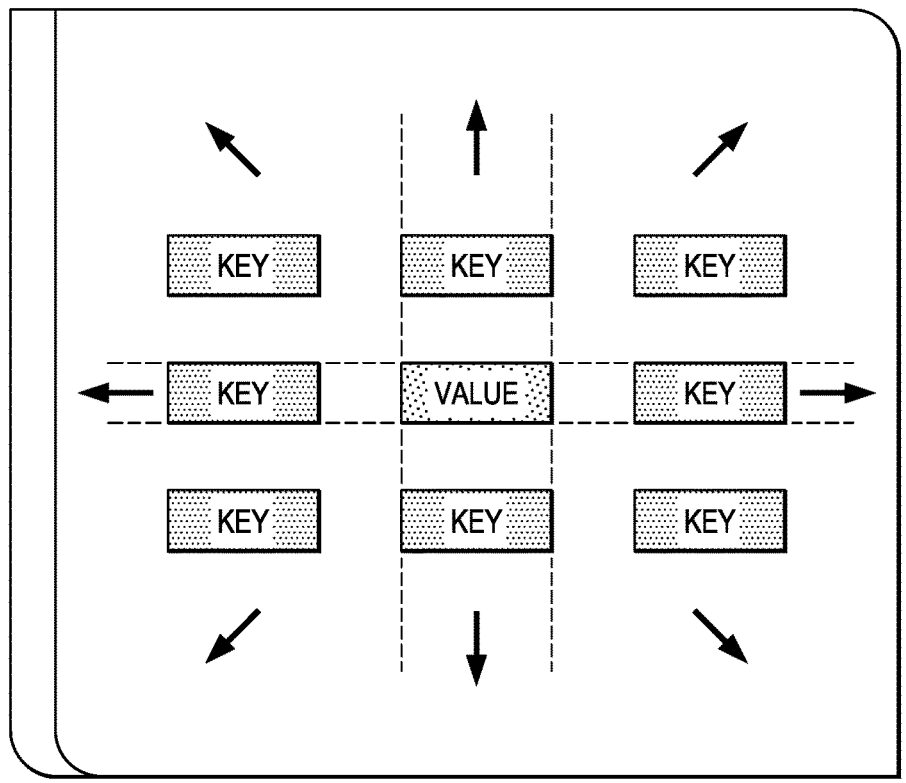

Orientation may also be utilized to determine whether two zones are in a neighborhood of one another. For example, alignment of two zones along a vertical, horizontal, or diagonal axis may be utilized to determine if two zones are in a neighborhood of one another. Accordingly, in an embodiment, to determine all key zones within a neighborhood of a value zone, all key zones that lie along a horizontal, vertical, or diagonal axis of the value zone may be determined, as depicted in FIG. 9C (where each key zone is depicted as being in the neighborhood of the value zone as they lie along a horizontal, vertical o diagonal axis of the value zone. Again, alignment along an axis may be determined, for example, based on the centroid of the zonal coordinates of the key zone or value zone, based on the edge or vertex coordinates of the key zone or value zone, or using some other point or edge as defined by the zonal coordinates of the key and value zones being evaluated.

Figure 10:
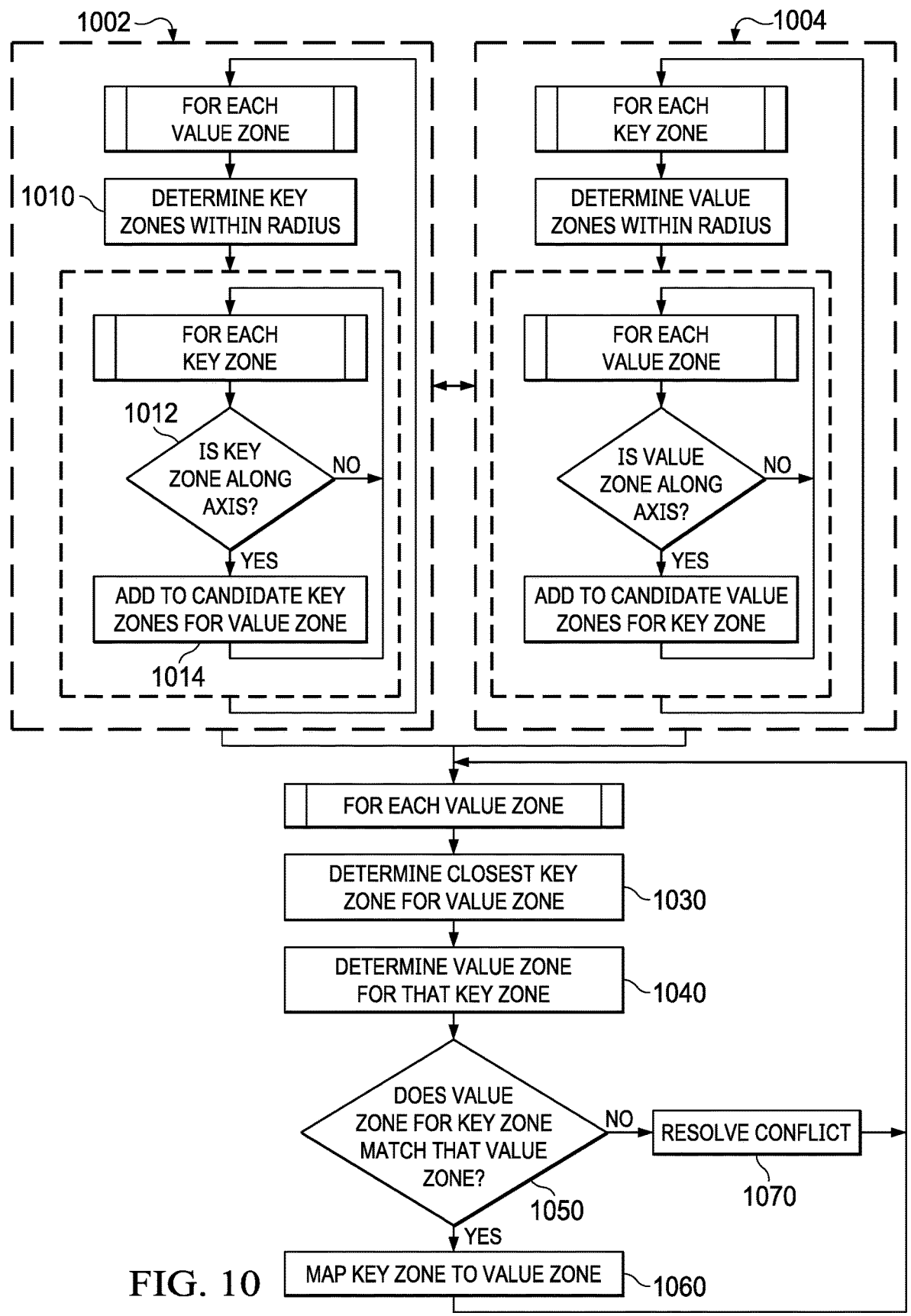
FIG. 10 is a flow diagram of one embodiment of a method for mapping key and value zones.

These methods of determining zones within a neighborhood of one another may be utilized in the mapping of key zones to value zones and value zones to key zones. FIG. 10 depicts one embodiment of a method for the mapping of key and value zones that may be utilized by embodiments of a document processing system. Here, a set of candidate key zones may be determined for each value zone (STEP 1002) and a set of candidate value zones may be determined for each key zone (STEP 1004). Specifically, for each value zone a set of key zones within a radius of that key zone may be determined (STEP 1010). For each of the key zones within that radius of that value zone it can be determined if that key zone is oriented along a horizontal, vertical, or diagonal axis of that value zone (STEP 1012). If the key zone is oriented along such an axis (Y branch of STEP 1012) it may be added to the set of candidate key zones for that value zone (STEP 1014). Similarly, for each key zone a set of value zones within a radius of that key zone may be determined (STEP 1020). For each of the value zones within that radius of that key zone it can be determined if that value zone is oriented along a horizontal, vertical, or diagonal axis of that key zone (STEP 1022). If the value zone is oriented along such an axis (Y branch of STEP 1022) it may be added to the set of candidate value zones for that key zone (STEP 1024).

Once a set of candidate key zones is determined for each value zone and a set of candidate value zones is determined for each key zones, the value zones may be mapped to a key zone (and each key zone may be correspondingly mapped to one or more value zones). In one embodiment, to accomplish this mapping for a value zone, the closest key zone for that value zone may be determined based on the zonal coordinates for the value zone and each candidate key zone (STEP 1030). Thus, a distance may be determined between the value zone and each candidate key zone associated with that value zone. This distance between two zones may be determined using a shortest distance between two edges of the two zones (or between two vertices of the two zones, or the distance between the edge and a nearest vertex of the two zones). The closest key zone of the candidate key zones for the value zone can then be determined based on the distance associated with each candidate key zone.

It can then be determined what the closest value zone is for that determined closest key zone (STEP 1040) based on the zonal coordinates for that closest key zone and each candidate value zone for that closest key zone. Again, an edge distance may be determined between the that key zone and each candidate value zone associated with that key zone. The closest value zone of the candidate value zones for that key zone can then be determined based on the distance associated with each candidate value zone. Accordingly, for the value zone being mapped the closest key zone to that value zone has been determined and the closest value zone for that closest key zone can also be determined.

It can then be determined if the value zone being mapped is also the closest value zone for the closest key zone determined for that value zone being mapped (STEP 1050). In other words, of the determined closest key zone is the closest key zone to the value zone and that value zone is the closest value zone for that key zone. If so (Y branch of STEP 1050), that determined closest key zone may be mapped to that value zone (STEP 1060) (and that value zone may also be mapped to that key zone). If the value zone being mapped is not the closest value zone for the closest key zone determined for that value zone (e.g., the key zone has a shorter edge to some other value zone) there is a conflict to resolve (STEP 1070). In one embodiment, this conflict may be resolved by obtaining the next closest key zone to the value zone being mapped and determining if the value zone being mapped is the closest value zone for that next closest key zone (and if it is then mapping the value zone to that key zone), and continuing the selection of next closest key zones for a value zone until a mapping is achieved for that value zone.

In some embodiments, probabilities may be utilized to resolve conflicts during mapping of value zones to key zones. Specifically, a macro orientation probability may be determined for a document type. Such a macro probability may include one or more orientation probabilities determined based on an orientation of the keys zones and value zones of the document type. As will be understood, in some document types certain values may be placed below their associated keys (as in the example of FIGS. 3A and 3B) (this is referred to as a top down alignment), while in other document types value may be placed above their keys (this is referred to as a bottom up alignment). Generally, the orientation of values relative to keys along the vertical axis is known as vertical alignment.

Similarly, in some document types certain values may be placed to the right of their keys (as in the example of FIGS. 3A and 3B) (known as a left right alignment) while in other documents certain values may be placed to the left of their keys (e.g., as in Arabic or Hebrew documents where the language is read right to left) (this alignment is known as a right left alignment). The orientation of values relative to keys along the horizontal axis is known as horizontal alignment.

Thus, for a document type a probability for a bottom up or top down alignment may be determined or a probability for a left right or right left alignment may also be determined. Thus, in one embodiment to resolve conflict such that a value zone may be mapped to a key zone, for each of a set of candidate key zones for a value zone a weighted score may be determined based on the distance (e.g., edge to edge distance or radial distance, or both) between the value zone and the candidate key zone, where that distance is weighted using the bottom up, top down, left right or right left probability determined for that document type to produce the weighted score. The probability to utilize for a particular value zone and candidate key zone may be determined based on the orientation of the candidate key zone relative to the value zone. For example, if the candidate key zone is above the value zones a top down probability may be utilized to generate a weighted score, while if the candidate key zone is below the value zone a bottom up probability may be utilized to generate a weighted score. Similarly, if the candidate key zone is to the right of the value zone a right left probability may be utilized to generate a weighted score while if the candidate key zone is to the right of the value zone a right left probability may be utilized to generate a weighted score. In this manner, each of the set of candidate key zones for a value zone may be ranked according to the generated weighted score and the candidate key zone with the highest weighted score may be mapped to that value zone.

Figure 11B:
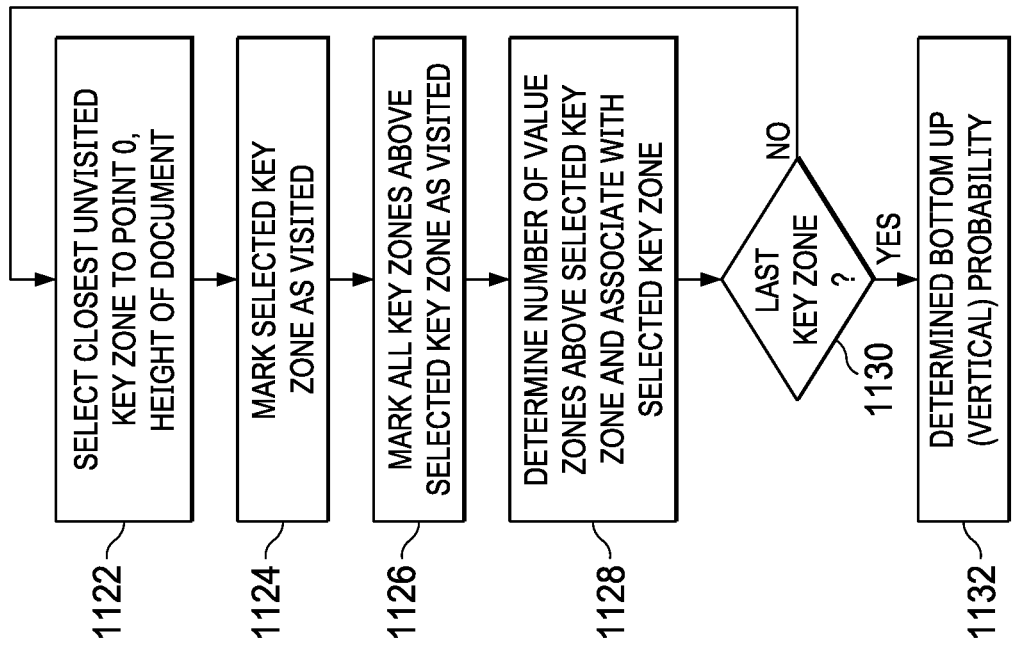
FIG. 11B is a flow diagram of one embodiment of a method for determining an orientation probability.
Figure 11A:
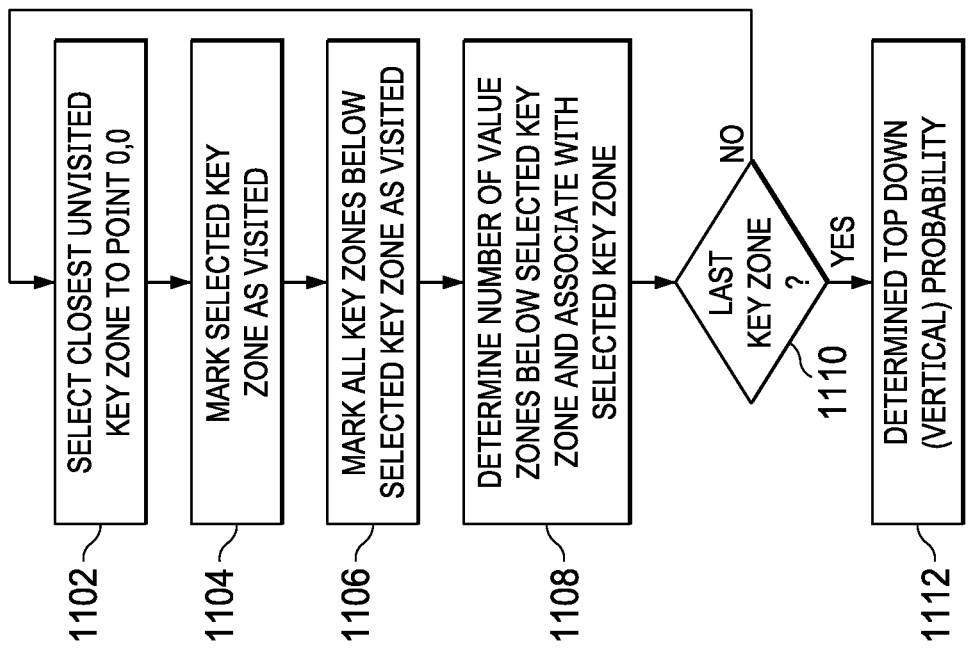
FIG. 11A is a flow diagram of one embodiment of a method for determining an orientation probability.

FIGS. 11A-11E depict embodiments of methods for the determination of orientation probabilities for document types. Referring first to FIG. 11A, one embodiment of a method for determining a top down probability (e.g., a score reflecting a likelihood that values are below their corresponding keys in the document type) is disclosed. Recall at this point that for a document type, there may be an associated set of key zones with corresponding zonal coordinates and value zones with corresponding zonal coordinates. Thus, to determine a top down probability each of the key zones may be marked as unvisited. Initially then, an unvisited key zone for the document type located nearest to the zonal coordinate (0,0) (the top left of a document) may be selected (STEP 1102) and marked as visited (STEP 1104). All key zones below the selected key zone may also be marked as visited (STEP 1106). The number of value zones below the selected key zone can then be visited (and marked as visited) and that number (of value zones below the selected key zone) can be associated with the selected key zone (STEP 1108). If that is not the last unvisited key zone (N branch of STEP 1110), the next unvisited key zone nearest to zonal coordinate (0,0) may be selected. Otherwise, if it all the key zones are marked as visited (Y branch of STEP 1110), the top down probability for the document type may be determined (STEP 1112). This top down probability may be the total number of visited value zones divided by the total number of key zones for the document type. In certain embodiments, an average of the number of value zones visited for each selected key zone may also be determined and utilized in the top down probability determination.

Looking at FIG. 11B now, one embodiment of a method for determining a bottom up probability (e.g., a score reflecting a likelihood that values are above their corresponding keys in the document type) is disclosed. To determine a bottom up probability each of the key zones may be marked as unvisited. Initially then, an unvisited key zone for the document type located nearest to the zonal coordinate (0, max document height) (the bottom left of a document) may be selected (STEP 1122) and marked as visited (STEP 1124). All key zones above the selected key zone may also be marked as visited (STEP 1126). The number of value zones above the selected key zone can then be visited (and marked as visited) and that number (of value zones above the selected key zone) can be associated with the selected key zone (STEP 1128). If that is not the last key zone (N branch of STEP 1130), the next unvisited key zone nearest to zonal coordinate (0, max document height) may be selected. Otherwise, if it all the key zones are marked as visited (Y branch of STEP 1130), the bottom up probability for the document type may be determined (STEP 1132). This bottom up probability may be the total number of visited value zones divided by the total number of key zones for the document type. In certain embodiments, an average of the number of value zones visited for each selected key zone may also be determined and utilized in the bottom up probability determination.

Figure 11C:
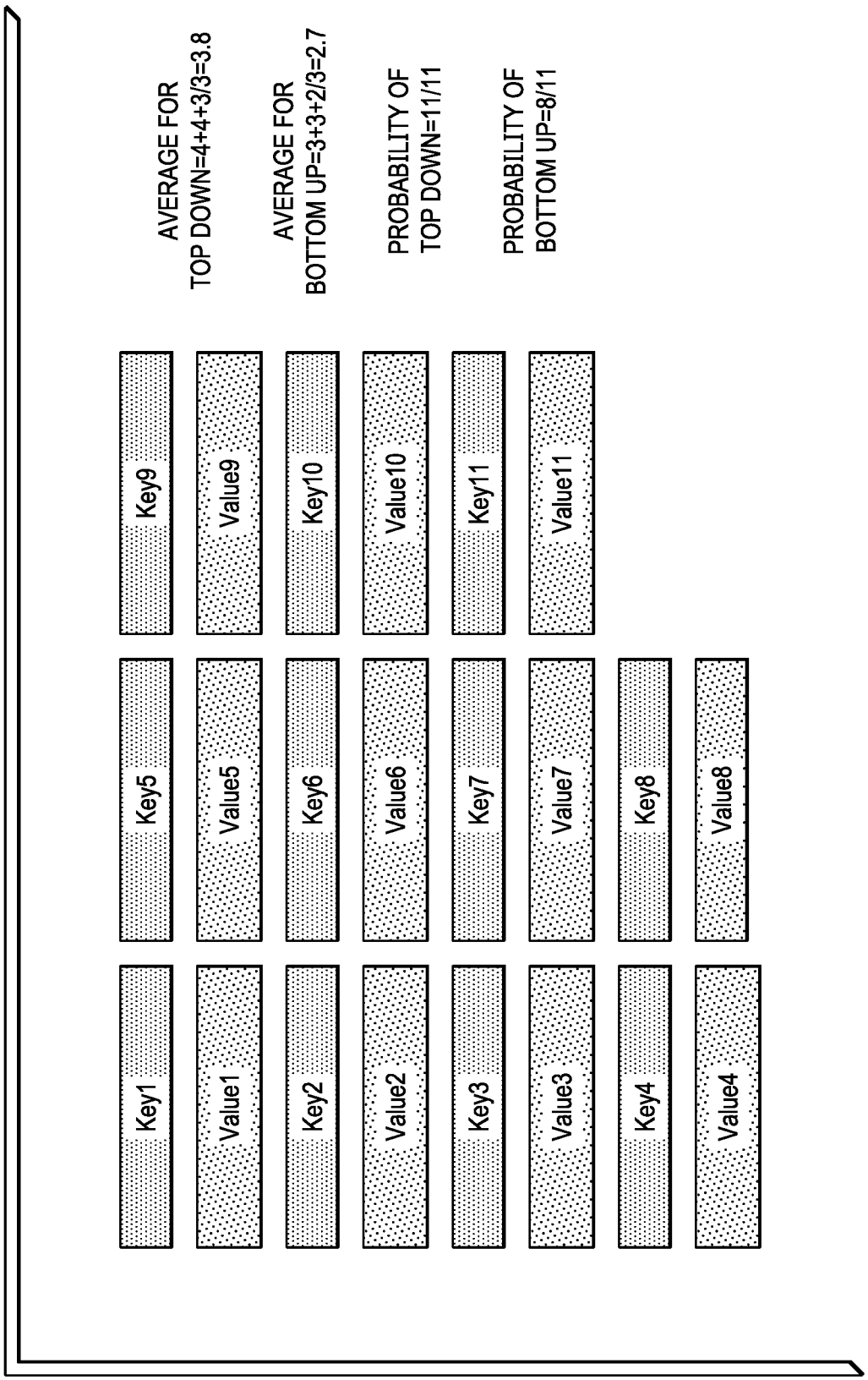
FIG. 11C is a graphical depiction of an example of determining an orientation probability according to an embodiment.

FIG. 11C depicts an example of a top down and bottom probability determination for a document type. For purposes of this example, assume that key zones 1-11 have been determined for that document type and are depicted in FIG. 11C according to their zonal coordinate (relative to zonal coordinate (0,0) the top left coordinate of a document. Additionally suppose that the value zones 1-11 have also been determined for that document type and are also depicted according to the zonal coordinates determined for those value zones. Thus, to determine a top down probability for such a document type each of the key zones 1-11 may be marked as unvisited. Initially then, as key zone 1 is unvisited and closest to coordinate (0,0) it may be selected and marked as visited. As key zones 2-4 are below selected key zone 1, they may also be marked as visited. Additionally, as value zones 1-4 are below selected key zone 1 a count of these values zone may be determined (4) and associated with the selected key zone (key zone 1), and these value zones 1-4 may be marked as visited.

As there remain unvisited key zones (e.g., key zones 5-11) the next unvisited key zone nearest to zonal coordinate (0,0) may be selected. In this example that is key zone 5. Key zone 5 may thus be selected and marked as visited. As key zones 6-8 are below selected key zone 5, they may also be marked as visited. Additionally, as value zones 5-8 are below selected key zone 5 a count of these values zones may be determined (4) and associated with the selected key zone (key zone 5), and these value zones 5-8 may be marked as visited. As there still remain unvisited key zones (e.g., key zones 9-11) the next unvisited key zone nearest to zonal coordinate (0,0) may be selected. In this example that is key zone 9. Key zone 9 may thus be selected and marked as visited. As key zones 10-11 are below selected key zone 9, they may also be marked as visited. Additionally, as value zones 9-11 are below selected key zone 9 a count of these values zones may be determined (3) and associated with the selected key zone (key zone 9), and these value zones 9-11 may be marked as visited. As there are no more unvisited key zones a top down probability may be determined as the total number of visited value zones (11) divided by the total number of key zones (11) for the document type.

Conversely to determine a bottom up probability for such a document type, each of the key zones 1-11 may be marked as unvisited. Initially then, as key zone 4 is unvisited and closest to coordinate (0,max document height) it may be selected and marked as visited. As key zones 3-1 are above selected key zone 4, they may also be marked as visited. Additionally, as value zones 3-1 are above selected key zone 4 a count of these values zone may be determined (3) and associated with the selected key zone (key zone 4), and these value zones 3-1 may be marked as visited.

As there remain unvisited key zones (e.g., key zones 5-11) the next unvisited key zone nearest to zonal coordinate (0,max document height) may be selected. In this example that is key zone 8. Key zone 8 may thus be selected and marked as visited. As key zones 7-5 are above selected key zone 8, they may also be marked as visited. Additionally, as value zones 7-5 are above selected key zone 8 a count of these values zone may be determined (3) and associated with the selected key zone (key zone 8), and these value zones 7-5 may be marked as visited. As there still remain unvisited key zones (e.g., key zones 9-11) the next unvisited key zone nearest to zonal coordinate (0,max document height) may be selected. In this example that is key zone 11. Key zone 11 may thus be selected and marked as visited. As key zones 10-9 are above selected key zone 11, they may also be marked as visited. Additionally, as value zones 10-9 are above selected key zone 11 a count of these values zones may be determined (2) and associated with the selected key zone (key zone 9), and these value zones 10-9 may be marked as visited. As there are no more unvisited key zones a top down probability may be determined as the total number of visited value zones (8) divided by the total number of key zones (11) for the document type.

Figure 11D:
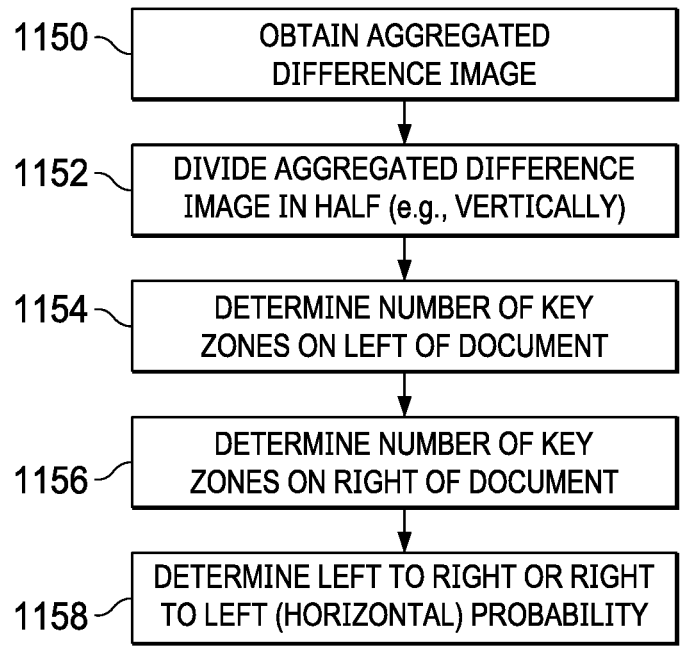
FIG. 11D is a flow diagram of one embodiment of a method for determining an orientation probability.

As discussed, in addition to bottom up or top down probabilities for a document type, a horizontal orientation probability may also be determined. FIG. 11D is a flow diagram depicting one embodiment of a method for determining a left to right or a right to left probability for a document type. Such a method may be better understood with reference to FIGS. 11E and 11F which depict, respectively, a left to right oriented document and a right to left oriented document. To determine a right left or left right probability for a document then, an aggregated difference image created from the set of example documents of that document type may be obtained along with an (e.g., thresholded denoised) image for an example document (STEP 1150). The example document can then be divided in half vertically (STEP 1152). A left count of the key zones on the left side of the document can then be determined along with a right count of the key zones on the right side of the aggregated difference image. These counts can be determined by subtracting the aggregated difference image from the image for the document as elaborated on earlier. The left right or right left probability of the document type can then be determined based on the left count and the right count. Specifically, if the left count is greater than the right count then the document is left aligned while if the right count is greater than the left count the document is right left aligned. Additionally, a left right probability can be determined by dividing the left count by the right count while the right left probability can be determined by dividing the right count by the left count.

It will also be noted that such probabilities may also be determined in certain embodiments using the zonal coordinates for each key zone as previously determined without reference again to an aggregated difference image or image of a document. Namely, a left count of key zones on the left side of the document can be determined from the zonal coordinates of the set of key zones and a right count of key zoned on the right side of the documents of the document type can be determined from the zonal coordinates of the set of key zones determined for the document type. These probabilities can thus be utilized in mapping key zones to value zones or value zones to key zones as discussed.

Figure 12:
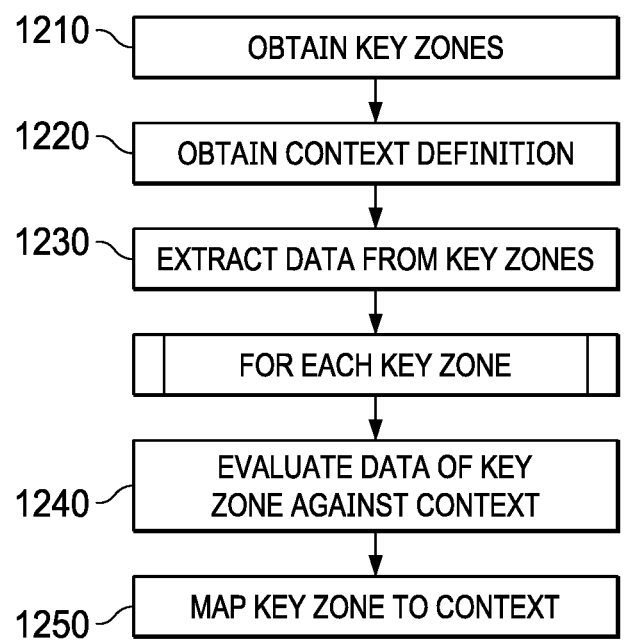
FIG. 12 is a flow diagram of one embodiment of a method for mapping key zones to a context definition.
Figure 11E:
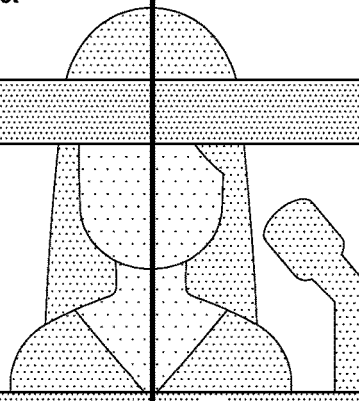

Once key zones are determined for a document type based on example documents of the document type, these key zones may be mapped to an obtained context definition. FIG. 12 depicts one embodiment of a method for mapping these key zones to a context definition and, in particular, to field definitions or labels within a context definition. Initially, the determined set of key zones (including the zonal coordinates for the key zone) for a document type can be obtained (STEP 1210). Additionally, a context definition may be obtained (STEP 1220). The keys (e.g., the text or other data) associated with each key zone can be determined (STEP 1230). To determine such a key for a key zone, an extraction may be performed at the zonal coordinates associated with that key zone on an example document. Such an extraction may be performed by applying OCR or the like to get key data from the key zone. This key (e.g., the data or key value extracted from the zonal coordinates identified for that key zone) can then be associated with that key zone.

Once the key data is associated with the key zone for each key zone, each of the key zones may be evaluated against the obtained context definition to associate key zones with (e.g., field definitions or labels) of the context definition (STEP 1240) to map the key zones to the context definition (STEP 1250). Here, the key data of a key zone may be compared against the field labels or other data of the context definition to determine if the key zone should be mapped to the context definition. In one embodiment, key data for a key zone may be evaluated against each field label to determine an edit distance (e.g., Levenshtein distance) between the key data associated with the key zone and the label for the field definition. A key zone may be associated with, for example, a label or field definition of the context definition with the lowest Levenshtein distance (e.g., if that Levenshtein distance is below some threshold, or some other key zone is not associated with a lower edit distance, etc.).

Other comparisons may also be utilized to determine if a key zone is to be associated with a context definition (or field definition of the context definition) and to which field definition if any such a key zone should be associated. Such comparisons may include using Natural Language Processing (NLP) techniques to generate a similarity value between the key data for a key zone and the label for the field definition of the context definition, and the key zone associated with a most similar field definition of the context definition (e.g., if the similarity is above some threshold value or some other key zone is not associated with greater similarity, etc.). As another technique for making such a comparison, feature vectors may also be utilized. A vector may be generated for the key data for a key zone (e.g., using word2vec or the like) and a vector may be generated for each label for each field definition. The vector for the key data for a key zone may then be compared with the vectors generated from the labels for each field definition for the context definition. The key zone can be associated with a most similar field definition of the context definition based on the comparison of the vectors (e.g., if the similarity is above some threshold value or some other key zone is not associated with greater similarity, etc.).

Once any key zones for the document type are identified and mapped to the context definition, data regarding the mappings may be returned to a user or requesting application. Specifically, each key zone extracted from the example documents (e.g., the zonal coordinates of the key zone such as the edges or vertices of the key zone) may be included in the provided data along with an identifier of an associated label or field definition of the context definition. Additionally, any value zones associated with each key zone may also be identified along with the zonal coordinates of those value zones. Thus, for example, the ranked list of value zones determined for the key zone may be included in the returned data along with the probability or weighting for that value zone relative to that key zone, along with probabilities or weightings (e.g., an orientation probability) determined from the set of example documents. In some cases, the actual values may also be extracted from the example documents (e.g., the values extracted from the value zones) and provided in the return data in association with those value zones. As embodiments may be implemented as a service in a computing environment, such return data may be provided in a data object suitable for use by computing application or system such as JSON.

Those skilled in the relevant art will appreciate that the invention can be implemented or practiced with various computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer-readable medium, hardware circuitry or the like, or any combination and that may be translatable by one or more server machines. Examples of a non-transitory computer-readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer-readable medium (e.g., ROM, RAM, and/or HD), hardware circuitry or the like, or any combination thereof. Within this disclosure, the term "computer-readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer-readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods, or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines, or portions thereof described herein, where such software programming or code can be stored in a computer-readable medium and can be operated on by a processor to permit a computer to perform any of the steps, operations, methods, routines, or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved by distributed or networked systems. Communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer-readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer-readable media storing computer instructions translatable by one or more processors in a computing environment.

A "processor" includes any, hardware system, mechanism or component that processes data, signals, or other information. A processor can include a system with a central processing unit, multiple processing units, dedicated circuitry for achieving functionality, or other systems. Processing need not be limited to a geographic location, or have temporal limitations. For example, a processor can perform its functions in "real-time", "offline", in a "batch mode", etc. Portions of processing can be performed at different times and at different locations, by different (or the same) processing systems.

As used herein, the terms "comprises", "comprising", "includes", "including", "has", "having", or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a", "an" or "a set" (and "the" when antecedent basis is "a", "an" or "a set") includes both singular and plural of such term, unless clearly indicated otherwise (i.e., that the reference "a", "an" or "a set" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the present disclosure should be determined by the following claims and their legal equivalents.

APPENDIX

Key Value Business Mapping
Macro Probabilities
Neighboring zones
Output Sample:
{
  "KeyValueMapping": {
    "0": {
      "192 977 124 17": "135 1029 209 53",
      "387 804 126 18": "533 835 61 14",
      "50 828 267 17": "156 751 104 12",
      "50 637 173 17": "161 675 57 13",
      "50 491 152 17": "192 546 51 12",
      "103 298 227 14": "158 324 96 15"
    }
  }, "MacroProbability": {
    "HorizontalAlignment": {
      "textalignment": "string",
      "probability": "string"
    },
    "VerticalAlignment": {
      "textalignment": "string",
      "probability": "string"
    }
  },
  "keys": [
    {
      "zoneId": "string",
      "A": {
        "X": "string",
        "Y": "string"
      },
      "B": {
        "X": "string",
        "Y": "string"
      },
      "C": {
        "X": "string",
        "Y": "string"
      },
      "D": {
        "X": "string",
        "Y": "string"
      },
      "Width": "string",
      "Height": "string",
      "Centroid": {

APPENDIX-continued

```
        "X": "string",
        "Y": "string"
      },
      "PossibleMatch": [
        {
          "ZoneID": "string",
          "Probability": "string",
          "Direction": "string"
        }
      ],
      "MappedZone": "string",
      "Edges": [
        {
          "X": "string",
          "Y": "string"
        }
      ],
      "Vertices": [
        {
          "p1": {
            "X": "string",
            "Y": "string"
          },
          "p2": {
            "X": "string",
            "Y": "string"
          }
        }
      ],
      "Visited": "string"
    }
  ],
  "values": [
    {
      "zoneId": "string"
      "A": {
        "X": "string",
        "Y": "string"
      },
      "B": {
        "X": "string",
        "Y": "string"
      },
      "C": {
        "X": "string",
        "Y": "string"
      },
      "D": {
        "X": "string",
        "Y": "string"
      },
      "Width": "string",
      "Height": "string",
      "Centriod": {
        "X": "string",
        "Y": "string"
      },
      "PossibleMatch": [
        {
          "ZoneID": "string",
          "Probability": "string",
          "Direction": "string"
        }
      ],
      "MappedZone": "string",
      "Edges": [
        {
          "X": "string",
          "Y": "string"
        }
      ],
      "Vertices": [
        {
          "p1":{
            "X": "string",
            "Y": "string"
          },
          "p2": {
            "X": "string",
            "Y": "string"
          }
```

APPENDIX-continued

```
        }
      ],
      "Visited": "string"
    }
  ]
}
```

What is claimed is:

1. A system for mapping zones in documents with a context, comprising:
a processor;
a non-transitory computer-readable medium comprising instructions for:
receiving a plurality of documents;
identifying key zones in the plurality of documents, the key zones representative of common keys in the plurality of documents, wherein identifying the key zones comprises:
generating a difference image for a pair of example documents of the plurality of documents based on denoised images for the example documents:
consolidating difference images for a plurality of pairs of the example documents;
removing the differences of the consolidated difference image from a denoised threshold image of one of the example documents;
associating key zones and value zones based on their relative positions within the denoised threshold image of the one of the example documents;
identifying values for each common key in each of the plurality of documents based on the associated key zone;
mapping the values for each identified value of each common key to a set of context fields.

2. The system of claim 1, wherein each document of the plurality of documents is converted into an image and identifying zones in the plurality of documents comprises:
determining the differences between and among the images;
combining the differences;
based on the combined determined differences, identifying the key zones in the images; and
for each key zone, generating a common value.

3. The system of claim 2, wherein each image comprises pixel values and determining the differences between and among the images comprises:
determining the difference in pixel values between and among the images.

4. The system of claim 1, wherein identifying values for each common key in each of the plurality of documents comprises:
determining the nearest common neighborhood zones to each value, determining the shortest edge distance between zones and each value, or determining the shortest distance between zones and each value.

5. The system of claim 1, wherein each document of the plurality of documents is converted into an image comprising pixels, and identifying zones in the plurality of documents further comprises:
determining the differences in pixels between and among the images, and;
combining the differences wherein the combined differences are representative of values in the documents; and subtracting the combined differences to identify the key zones in the documents; and for each key zone, generating a common key; and identifying values for each common key in each of the plurality of documents further comprises:

determining the nearest common neighborhood zones to each value, determining the shortest edge distance between zones and each value, or determining the shortest distance between zones and each value.

6. The system of claim 1, wherein mapping the values for each common key to a set of context fields comprises:

mapping each common key to one of the context fields in the set of context fields; and assigning the identified value for the common key to the one of the context fields.

7. The system of claim 6, wherein mapping each common key to one of the context fields in the set of context fields comprises:

evaluating data associated with each common key with the set of context fields; and based on the evaluating, mapping the one of the context fields to each common key.

8. A method for mapping zones in documents with a context, comprising:

receiving a plurality of documents;

identifying key zones in the plurality of documents, the key zones representative of common keys in the plurality of documents, wherein identifying the key zones comprises:

generating a difference image for a pair of example documents of the plurality of documents based on denoised images for the example documents;

consolidating difference images for a plurality of pairs of the example documents;

removing the differences of the consolidated difference image from a denoised threshold image of one of the example documents;

associating key zones and value zones based on their relative positions within the denoised threshold image of the one of the example documents;

identifying values for each common key in each of the plurality of documents based on the associated key zone;

mapping the values for each identified value of each common key to a set of context fields.

9. The method of claim 8, wherein each document of the plurality of documents is converted into an image and identifying zones in the plurality of documents comprises:

determining the differences between and among the images;

combining the differences;

based on the combined determined differences, identifying the key zones in the images; and for each key zone, generating a common value.

10. The method of claim 9, wherein each image comprises pixel values and determining the differences between and among the images comprises:

determining the difference in pixel values between and among the images.

11. The method of claim 8, wherein identifying values for each common key in each of the plurality of documents comprises:

determining the nearest common neighborhood zones to each value, determining the shortest edge distance between zones and each value, or determining the shortest distance between zones and each value.

12. The method of claim 8, wherein each document of the plurality of documents is converted into an image comprising pixels, and identifying zones in the plurality of documents further comprises:

determining the differences in pixels between and among the images, and;

combining the differences wherein the combined differences are representative of values in the documents; and subtracting the combined differences to identify the key zones in the documents; and for each key zone, generating a common key; and identifying values for each common key in each of the plurality of documents further comprises:

determining the nearest common neighborhood zones to each value, determining the shortest edge distance between zones and each value, or determining the shortest distance between zones and each value.

13. The method of claim 8, wherein mapping the values for each common key to a set of context fields comprises:

mapping each common key to one of the context fields in the set of context fields; and assigning the identified value for the common key to the one of the context fields.

14. The method of claim 13, wherein mapping each common key to one of the context fields in the set of context fields comprises:

evaluating data associated with each common key with the set of context fields; and based on the evaluating, mapping the one of the context fields to each common key.

15. A non-transitory computer readable medium comprising instructions, the instructions executable by a processor for mapping zones in documents with a context by:

receiving a plurality of documents;

identifying key zones in the plurality of documents, the key zones representative of common keys in the plurality of documents, wherein identifying the key zones comprises:

generating a difference image for a pair of example documents of the plurality of documents based on denoised images for the example documents;

consolidating difference images for a plurality of pairs of the example documents;

removing the differences of the consolidated difference image from a denoised threshold image of one of the example documents;

associating key zones and value zones based on their relative positions within the denoised threshold image of the one of the example documents;

identifying values for each common key in each of the plurality of documents based on the associated key zone;

mapping the values for each identified value of each common key to a set of context fields.

16. The non-transitory computer readable medium of claim 15, wherein each document of the plurality of documents is converted into an image and identifying zones in the plurality of documents comprises:

determining the differences between and among the images;

combining the differences;

based on the combined determined differences, identifying the key zones in the images; and for each key zone, generating a common value.

17. The non-transitory computer readable medium of claim 16, wherein each image comprises pixel values and determining the differences between and among the images comprises:

determining the difference in pixel values between and among the images.

18. The non-transitory computer readable medium of claim 15, wherein identifying values for each common key in each of the plurality of documents comprises:

determining the nearest common neighborhood zones to each value, determining the shortest edge distance between zones and each value, or determining the shortest distance between zones and each value.

19. The non-transitory computer readable medium of claim 15, wherein each document of the plurality of documents is converted into an image comprising pixels, and identifying zones in the plurality of documents further comprises:

determining the differences in pixels between and among the images, and;

combining the differences wherein the combined differences are representative of values in the documents; and subtracting the combined differences to identify the key zones in the documents; and for each key zone, generating a common key; and identifying values for each common key in each of the plurality of documents further comprises:

determining the nearest common neighborhood zones to each value, determining the shortest edge distance between zones and each value, or determining the shortest distance between zones and each value.

20. The non-transitory computer readable medium of claim 15, wherein mapping the values for each common key to a set of context fields comprises:

mapping each common key to one of the context fields in the set of context fields; and assigning the identified value for the common key to the one of the context fields.

21. The non-transitory computer readable medium of claim 20, wherein mapping each common key to one of the context fields in the set of context fields comprises:

evaluating data associated with each common key with the set of context fields; and based on the evaluating, mapping the one of the context fields to each common key.

\* \* \* \* \*